(12) United States Patent
Kaul

(10) Patent No.: US 10,594,192 B1
(45) Date of Patent: Mar. 17, 2020

(54) BRUSHLESS MOTOR/GENERATOR

(71) Applicant: Anoup Kaul, San Bruno, CA (US)

(72) Inventor: Anoup Kaul, San Bruno, CA (US)

( * ) Notice: Subject to any disclaimer, the term of this patent is extended or adjusted under 35 U.S.C. 154(b) by 678 days.

(21) Appl. No.: 15/241,864

(22) Filed: Aug. 19, 2016

Related U.S. Application Data

(60) Provisional application No. 62/207,682, filed on Aug. 20, 2015.

(51) Int. Cl.
H02K 11/22 (2016.01)
H02K 1/27 (2006.01)
H02K 3/28 (2006.01)

(52) U.S. Cl.
CPC ............. H02K 11/22 (2016.01); H02K 1/27 (2013.01); H02K 3/28 (2013.01)

(58) Field of Classification Search
CPC .......... H02K 1/02; H02K 1/16; H02K 1/2753; H02K 11/33; H02K 21/12; H02K 3/02; H02K 3/28; H02K 3/47; H02K 21/14; H02K 21/24; H02K 2213/03; H02K 3/04; H02K 53/00; H02K 11/22; H02K 1/127; Y10S 74/09
USPC ...................................................... 310/68 B
See application file for complete search history.

(56) References Cited

U.S. PATENT DOCUMENTS

| 3,665,227 | A | * | 5/1972 | Busch | H02K 25/00 310/46 |
| 4,758,750 | A | * | 7/1988 | Itagaki | H02K 41/031 310/13 |
| 5,179,307 | A | * | 1/1993 | Porter | H02K 29/10 310/156.32 |
| 5,455,474 | A | * | 10/1995 | Flynn | H02K 21/24 310/152 |
| 5,481,143 | A | * | 1/1996 | Burdick | H02K 1/148 310/216.079 |
| 5,798,591 | A | * | 8/1998 | Lillington | H02K 3/04 310/164 |
| 6,812,906 | B2 | * | 11/2004 | Goldstein | H01Q 11/08 343/895 |
| 2005/0242677 | A1 | * | 11/2005 | Akutsu | H02K 3/28 310/179 |
| 2017/0331340 | A1 | * | 11/2017 | Garay Silva | H02K 11/33 |

FOREIGN PATENT DOCUMENTS

CL     2014002887     *  8/2015

* cited by examiner

Primary Examiner — Jermele M Hollington
Assistant Examiner — Ahmed Elnakib
(74) Attorney, Agent, or Firm — Matthew M. Googe; Robinson IP Law, PLLC

(57) ABSTRACT

A brushless motor is provided, the brushless motor having: a rotor disk including a plurality of permanent magnets attached to the rotor disk around a circumference of the rotor disk; a plurality of C-coils arranged in connected pairs; at least one circuit in electronic communication with one or more of the C-coils; and at least one optical sensor in electronic communication with the one or more circuits, the optical sensor positioned adjacent to the rotor disk at a radius of a plurality of optical slots in the rotor disk; wherein the circuit outputs a voltage to one or more of the plurality of C-coils, and wherein a value of the output voltage from the circuit is based on the optical sensor being in alignment with one of the plurality of optical slots of the rotor disk.

11 Claims, 31 Drawing Sheets

Prior Art

FIG. 28

| Theta (degrees) | Comparator C1 | Comparator C2 | Comparator C3 | Comparator C4 | AND Gate D1 | AND Gate D2 | Next Direction |
|---|---|---|---|---|---|---|---|
| 1 | 0 | 1 | 0 | 1 | 0 | 1 | ↑ |
| 11 | 0 | 1 | 1 | 1 | 0 | 1 | ↑ |
| 12 | 0 | 1 | 1 | 0 | 0 | 0 | |
| 22 | 0 | 1 | 1 | 0 | 0 | 0 | |
| 23 | 0 | 1 | 0 | 0 | 0 | 0 | |
| 33 | 0 | 1 | 0 | 1 | 1 | 1 | ↑ |
| 34 | 1 | 0 | 0 | 1 | 1 | 1 | ↑ |
| 44 | 1 | 0 | 1 | 1 | 0 | 0 | ↓ |
| 46 | 1 | 0 | 1 | 1 | 0 | 0 | ↓ |
| 55 | 1 | 0 | 1 | 0 | 0 | 0 | |
| 56 | 1 | 0 | 0 | 0 | 0 | 0 | |
| 67 | 1 | 0 | 0 | 1 | 0 | 0 | |
| 68 | 0 | 1 | 0 | 1 | 0 | 0 | ↓ |
| 78 | 0 | 1 | 1 | 1 | 1 | 0 | ↓ |
| 79 | 0 | 1 | 1 | 0 | 1 | 0 | |
| 89 | 0 | 1 | 1 | 0 | 0 | 0 | |
| 91 | 0 | 1 | 0 | 0 | 0 | 1 | ↑ |

BRUSHLESS MOTOR/GENERATOR

CROSS-REFERENCE TO RELATED APPLICATION

This application claims priority to U.S. Patent Application Ser. No. 62/207,682 by Anoup Kaul for a "Brushless Motor/Generator", which was filed on Aug. 20, 2015, the contents of which are incorporated herein by reference in its entirety.

FIELD

This disclosure relates to the field of electric motors. More particularly, this disclosure relates to a brushless electric motor having transversely mounted magnets around a rotor disk.

BACKGROUND

Current flowing through a wire will produce a magnet field. The right hand rule, shown by FIG. 1(a), illustrates the relationship between the direction current flows in a wire and the direction of the magnetic field it creates wrapping around the wire. This phenomenon can be used to create motion by placing the wire next to a permanent magnet and allowing the magnetic forces to push or pull one another. Referring to FIG. 1B, it can be seen that by wrapping the wire into a coil the magnetic field becomes stronger on the inside where it converges and weaker on the outside where it diverges.

Most direct current (DC) electric motors with rotary motion are designed such that the permanent magnet moves outside the convergent area of the coil. FIG. 2 shows a typical rotary DC motor configuration 1. However, only one side of a coil 2 and only one side of magnets 31 and 32 does the pushing or pulling to induce rotation about an axle 33. Motors need to switch/commutate (i.e., reverse) the direction of the magnetic field to maintain continuous motion. Brushless DC motors typically use a sensor to detect the rotor position with respect to the stator and electric circuitry to switch the direction the motor current is flowing. Brushed DC motors do this mechanically by contacting the coil leads (i.e., brushes) with a commutator, which provides positive or negative power depending on the axial position of the leads.

Different motors can be compared based on the efficiency with which electrical power is converted to mechanical torque, torque range, power range and mass, as well as their cost of production and reliability.

SUMMARY

Various embodiments improve upon conventional brushless motors by utilizing a coil-shaped wire structure that allows the permanent magnets to travel through the convergent portion of the coil.

By mounting permanent magnets transversely on the rotor and winding "C" shaped coil pairs, a convergent magnetic field can be generated that attracts and repels the magnets. This arrangement allows for a more efficient use of the coils and magnets as each side of the magnet, as well as each side of the coil, is utilized with respect to electric power and system mass.

In a first aspect, a brushless motor is provided having: a rotor disk including a plurality of magnet slots arranged around a perimeter of the rotor disk, the plurality of slots oriented substantially perpendicular to a circumference of the rotor disk and a plurality of optical slots arranged circumferentially at a fixed radius around and from a center of the rotor disk; a plurality of permanent magnets attached to the rotor disk and positioned within the plurality of magnet slots oriented perpendicular to the circumference of the rotor disk, the permanent magnets oriented such that the poles each of the plurality of magnets are opposite the poles of adjoining permanent magnets; a plurality of C-coils arranged in connected pairs, each of the C-coils including a coil loop body and a channel formed in the coil loop body, wherein each pair of C-coils is connected with a pair of legs, and wherein the C-coils are supported by a housing such that the permanent magnets attached to the rotor disk pass substantially within the coil loop body; at least one circuit in electronic communication with one or more of the C-coils; and at least one optical sensor in electronic communication with the one or more circuits, the optical sensor positioned adjacent to the rotor disk at a radius of the plurality of the plurality of optical slots. The circuit outputs a voltage to one or more of the plurality of C-coils, and wherein a value of the output voltage from the circuit is based on the optical sensor being in alignment with one of the plurality of optical slots of the rotor disk.

In one embodiment, when the optical sensor is aligned with one of the plurality of optical slots the circuit induces a current flow in a first direction, and when the optical sensor is aligned with a solid portion of the rotor disk the circuit induces a current flow in a second direction that is opposite the first direction such that the brushless motor is substantially bipolar.

In another embodiment, each C-coil of a pair of C-coils is oriented at an offset angle relative to one another such that each C-coil is aligned with the plurality of optical slots of the rotor disk.

In yet another embodiment, one C-coil of a pair of C-coils is wound in a clockwise direction, and another C-coil of the pair of C-coils is wound in a counter-clockwise direction.

In one embodiment, the plurality of optical slots are aligned at a first edge with a center of one of the magnet slots and at a second edge with a center of an adjoining magnet slot.

In another embodiment, at least one pair of C-coils is substantially interleaved with an adjoining pair of C-coils such that a C-coil of one pair of C-coils is between C-coils of another C-coil pair.

In yet another embodiment, one pair of C-coils comprises a first phase C-coil pair and the other pair comprises a second phase C-coil pair.

In one embodiment, the brushless motor further includes one or more second phase optical slots arranged circumferentially at a second fixed radius.

In another embodiment, one pair of interleaved C-coils is in communication with a first phase circuit, and wherein the other pair of interleaved C-coils is in communication with a second phase circuit.

In yet another embodiment, the plurality of permanent magnets and plurality of C-coils are oriented around the rotor disk such that when one permanent magnet is aligned in a center of at least one C-coil, another permanent magnet is aligned in a center of another C-coil.

In one embodiment, the C-coils are supported by a plurality of C-coil plates, each of the C-coil plates including a central hole formed therethrough and an opening along an interior edge of the C-coil plate to accommodate the rotor disk and pair of legs of the C-coils.

In a second aspect, a brushless motor is provided having: a rotor disk including a plurality of permanent magnets attached to the rotor disk, the permanent magnets oriented such that a north face and south face of the permanent magnet are perpendicular to an outer edge of the rotor disk, wherein the permanent magnets are substantially uniformly spaced around an edge of the rotor disk and wherein a polarity of adjoining permanent magnets is substantially reversed; one or more optical slots arranged circumferentially at a radial distance from a center of the rotor disk, the optical slots extending from a first edge that is substantially aligned with a center of one of the plurality of permanent magnets to a second edge that is substantially aligned with a center of an adjoining permanent magnet; at least one pair of C-coils, each C-coil having a coil loop body and a channel formed through a center of the coil loop body for accommodating one of the plurality of permanent magnets and a gap formed along an edge of the C-coils for accommodating the rotor disk, the C-coils connected with a pair of legs; at least one circuit in electronic communication with the at least one pair of C-coils for controlling a current supplied to the C-coils; and an optical sensor in electronic communication with the at least one circuit, the optical sensor including a light projecting element and a light detecting element, the optical sensor positioned adjacent the optical slots of the rotor disk.

In a third aspect, a brushless motor is provided having: a rotor disk including a plurality of magnet slots arranged around a perimeter of the rotor disk, the plurality of slots oriented substantially perpendicular to a circumference of the rotor disk, a plurality of first phase optical slots arranged circumferentially at a first radial distance from a center of the rotor disk, and a plurality of second phase optical slots arranged circumferentially at a second radial distance from a center of the rotor disk; a plurality of permanent magnets attached to the rotor disk and positioned within the plurality of magnet slots oriented perpendicular to the circumference of the rotor disk, the permanent magnets oriented such that the poles each of the plurality of magnets are opposite the poles of adjoining permanent magnets; at least one pair of first phase C-coils, each of the first phase C-coils including a coil loop body and a channel formed in the coil loop body, wherein each pair of C-coils is connected with a pair of legs, and wherein the C-coils are supported by a housing such that the permanent magnets attached to the rotor disk pass substantially within the coil loop body; at least one pair of second phase C-coils, each of the second phase C-coils including a coil loop body and a channel formed in the coil loop body, wherein each pair of C-coils is connected with a pair of legs, and wherein the C-coils are supported by a housing such that the permanent magnets attached to the rotor disk pass substantially within the coil loop body; at least one circuit in electronic communication with one or more of the C-coils; a first optical sensor in electronic communication with the one or more circuits, the first optical sensor positioned adjacent to the rotor disk at the first radial distance of the first phase optical slots; and a second optical sensor in electronic communication with the one or more circuits, the second optical sensor positioned adjacent to the rotor disk at the second radial distance of the second phase optical slots. The circuit outputs a voltage to one or more of the plurality of C-coils, and wherein a value of the output voltage from the circuit is based on the first optical sensor being in alignment with one of the plurality of first optical slots of the rotor disk and the second optical sensor being in alignment with one of the plurality of second optical slots of the rotor disk.

In one embodiment, the at least one pair of first phase C-coils is interleaved with the at least one pair of second phase C-coils such that a C-coil of one C-coil pair is positioned between C-coils of an adjoining C-coil pair.

BRIEF DESCRIPTION OF THE DRAWINGS

Further features, aspects, and advantages of the present disclosure will become better understood by reference to the following detailed description, appended claims, and accompanying figures, wherein elements are not to scale so as to more clearly show the details, wherein like reference numbers indicate like elements throughout the several views, and wherein:

FIG. 28 is a truth table of interleaved phase i control circuit according to one embodiment of the present disclosure;

DETAILED DESCRIPTION

Figure 1A:
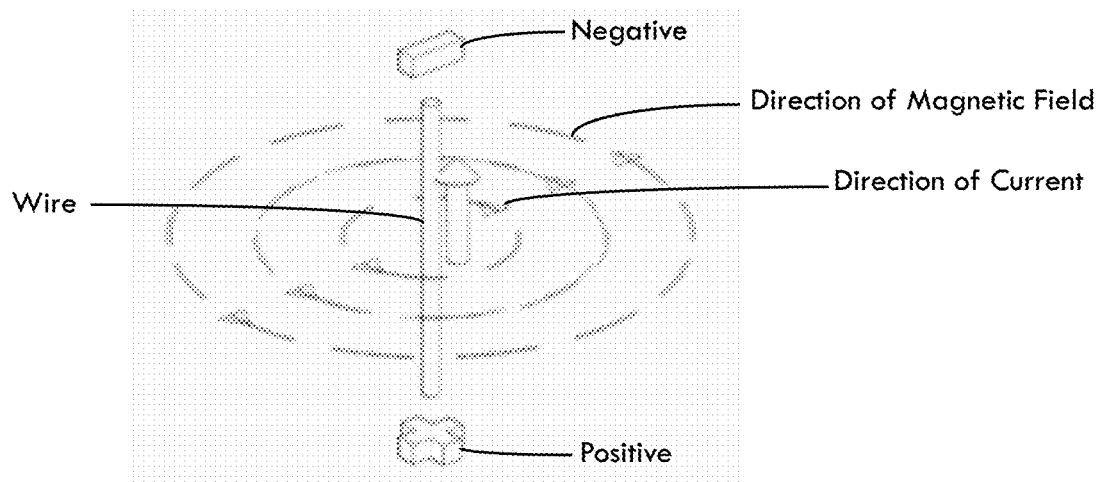
FIGS. 1(a) and 1(b) illustrates a wire carrying current and an associated convergent and divergent magnetic fields.
Figure 1B:
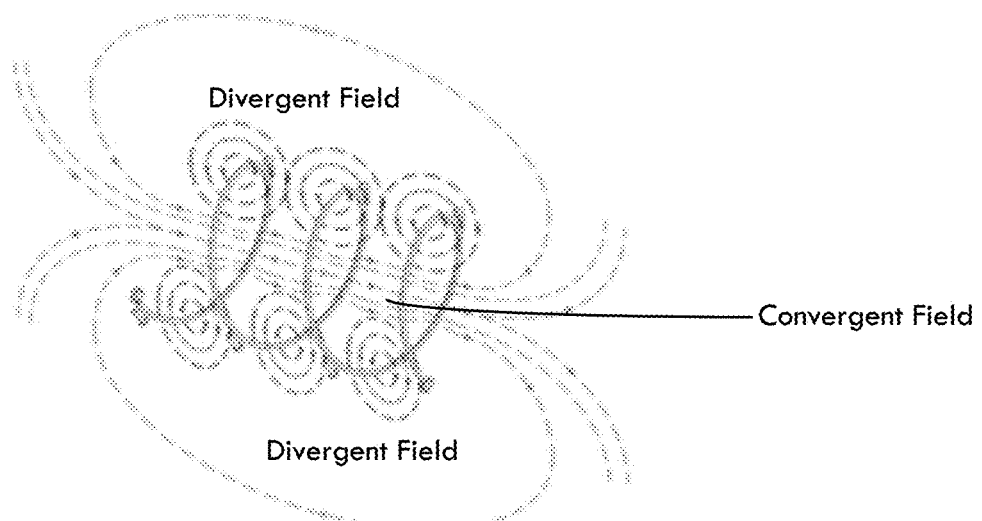
Figure 2:
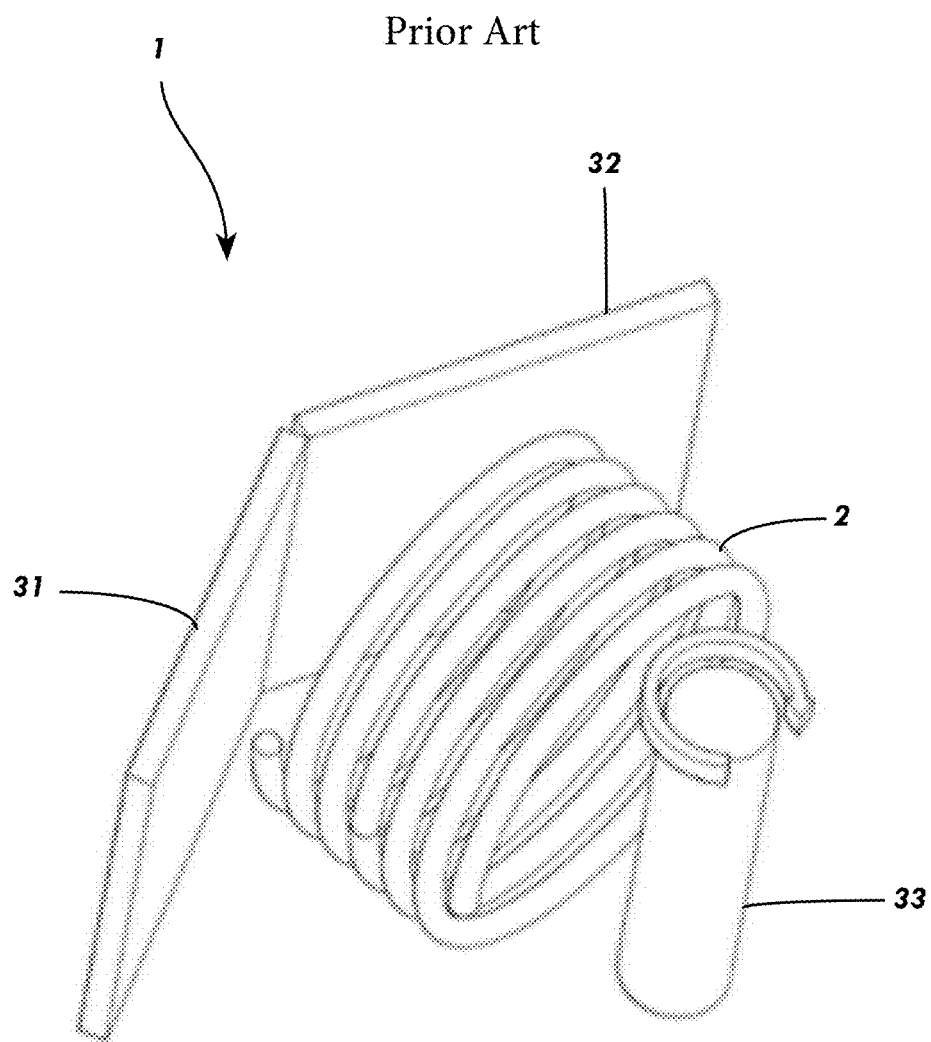
FIG. 2 illustrates a prior art DC motor configuration.

Various terms used herein are intended to have particular meanings. Some of these terms are defined below for the purpose of clarity. The definitions given below are meant to cover all forms of the words being defined (e.g., singular, plural, present tense, past tense). If the definition of any term below diverges from the commonly understood and/or dictionary definition of such term, the definitions below control.

A brushless motor 100 is provided having a rotor disk 9, one or more permanent magnets 102 mounted to the rotor disk 9, and one or more pairs of C-coils 104 arranged around a perimeter of the rotor disk 9. The one or more pairs of C-coils 104 are attached between a top plate 15 and a bottom plate 16 of a motor housing. The rotor disk 9 is rotatably mounted to a shaft 106 aligned with a center of the rotor disk 9. At least one optical sensor 108 is located adjacent the rotor disk and is aligned to project a light source onto one or more optical slots 14 of the rotor disk 9. The one or more pairs of C-coils are in communication with a circuit for inducing a current in the C-coils in response to the optical sensor 108 detecting the optical slots 14 to attract and repel the one or more permanent magnets 102, thereby inducing a rotation in the rotor disk 9.

Rotor

Figure 4A:
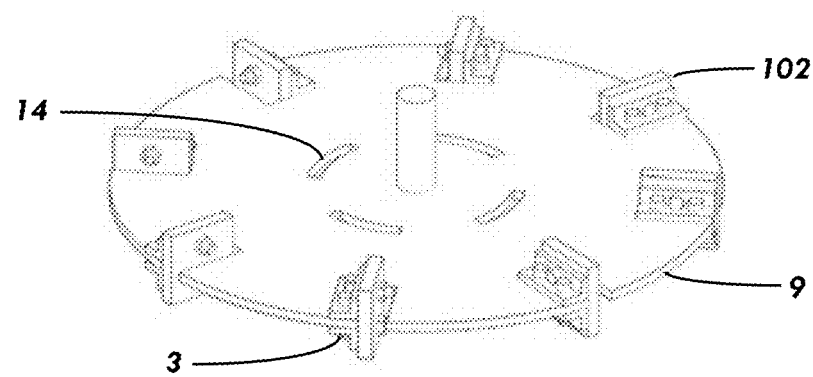
FIG. 4(a) is a top perspective view of a rotor disk of a brushless according to one embodiment of the present disclosure.
Figure 4B:
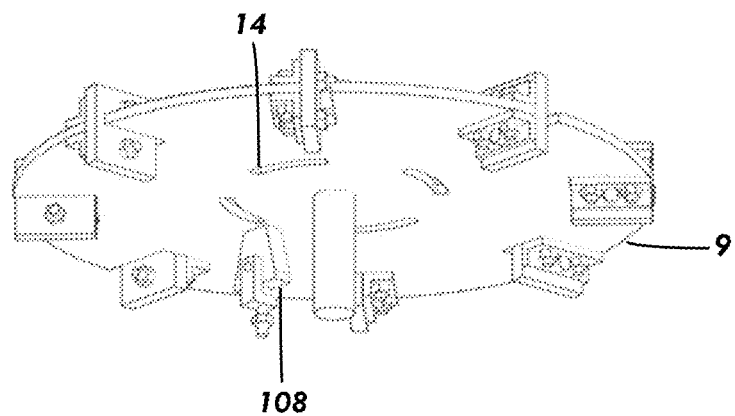
FIG. 4(b) is a bottom perspective view of rotor disk of a brushless motor including an optical sensor according to one embodiment of the present disclosure.
Figure 4C:
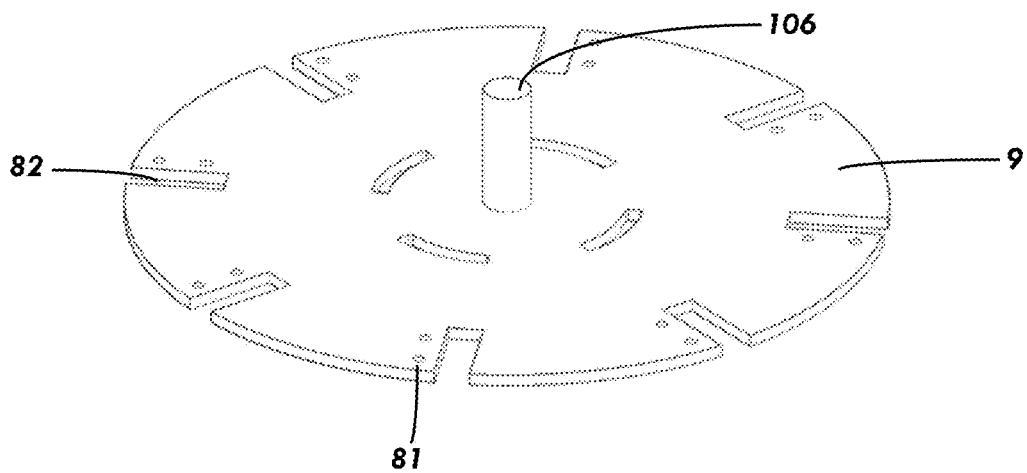
FIG. 4(c) is a top perspective view of a rotor disk of a brushless motor according to one embodiment of the present disclosure.

Referring to FIG. 4(c), a rotor shaped disk 9 is shown having a plurality of magnet slots 82 around a perimeter of the rotor disk 9 for mounting one or more permanent magnets 102. A depth and width of the slots should be adjusted to accommodate a width and thickness of the permanent magnets. The perimeter slots 82 are preferably arranged uniformly around the perimeter of the rotor disk 9. As referred to herein, "N" is the total number of permanent magnets mounted on the rotor. This value is also referred to as the number of poles of a motor. For a motor with N poles, the angle (theta_rotor_magnet_angle 36 shown in FIG. 21) between each pair of magnet slots 82 is preferably:

theta_rotor_magnet_angle=360 deg/N.

The rotor illustrated in FIG. 4(c), for example, is configured for 8 poles. Magnet bracket mounting holes 81 may be located along one or both edges of each of the plurality of magnet slots 82. The rotor of FIG. 4(c), for instance, includes the magnet bracket mounting holes 81 located on the edge of each slot 82. The magnet bracket mounting holes 81 are optional, and it is understood that the permanent magnets may be fixed to the rotor disk 9 by various other fasteners means of attaching the permanent magnets to the rotor disk 9.

Figure 21:
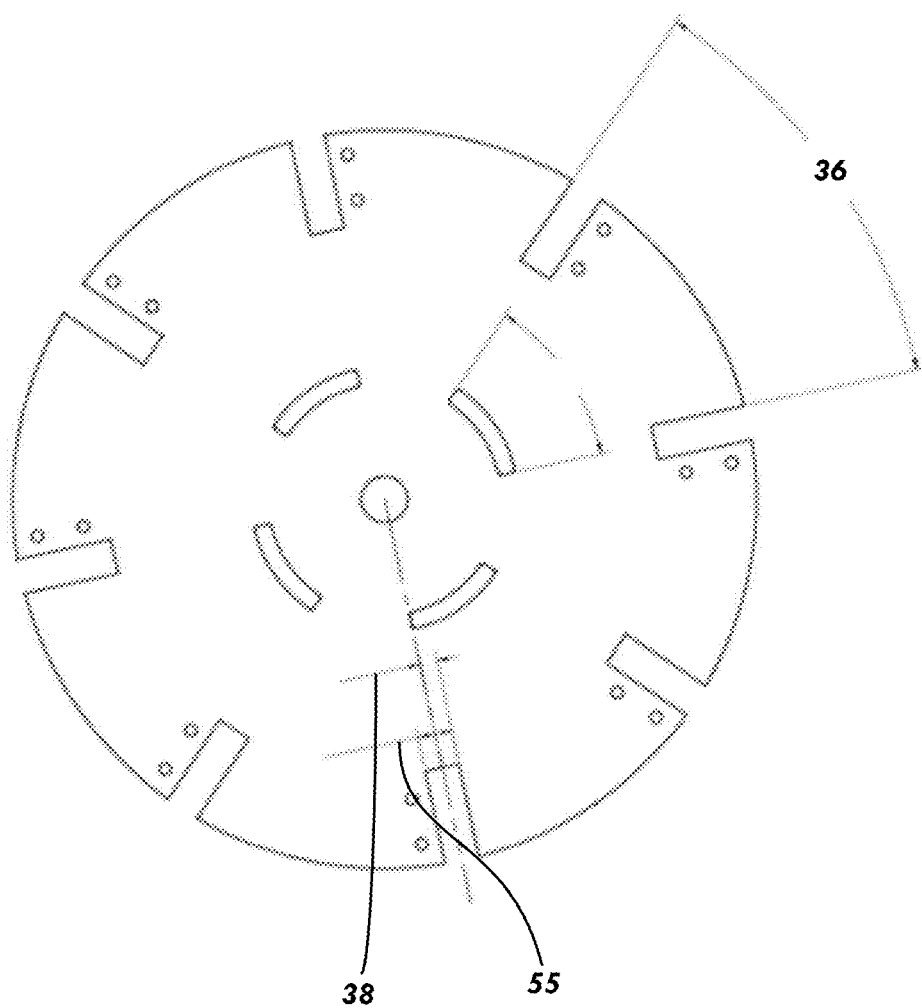
FIG. 21 illustrates a rotor disk and optical sensor slots according to one embodiment of the present disclosure.

In addition to the magnet slots 82 located around a perimeter of the rotor disk 9, one or more optical slots 14 are placed internal to the rotor body, as shown in FIG. 4A. Generally, the optical slots 14 are arranged circumferentially along a fixed radius and are uniformly spaced. Each optical slot 14 preferably has the same angular width (theta_optical_slot1 37 as shown in FIG. 21), which is equal to:

theta_optical_slot1=360 deg/N.

The total number of optical slots 14 can vary. For example, in some embodiments the number of optical slots 14 needed is N/2. As shown in FIG. 21, an optical sensor 1 alignment 38 is with a middle of a width 55 of the magnet 82 slot. A through hole 83 is located in the center of the rotor. A rotor shaft 4 extends through the through hole 83 and supports the rotor disk 9, as shown in FIG. 4(b).

Magnet Mounting L-Bracket

Referring to FIG. 4(b), embodiments include one or more magnet mounting L-brackets 3 having holes on one or both faces. For example, the L-brackets 3 shown in FIG. 4(b) have through holes on both perpendicular faces of the L-brackets 3. Holes on a surface of the L-bracket 3 facing the rotor can be used for mounting purposes (e.g., using screws, nuts, bolts). Similarly, holes on a surface facing the magnet can be used for mounting the permanent magnets with non-ferrous screws, nuts, bolts, etc. Both sets of through holes are optional. For instance, the L-brackets 3 could instead be mounted to either the rotor disk 9 or permanent magnets with an adhesive material if desired.

Magnet Orientation Around Rotor

Figure 5A:
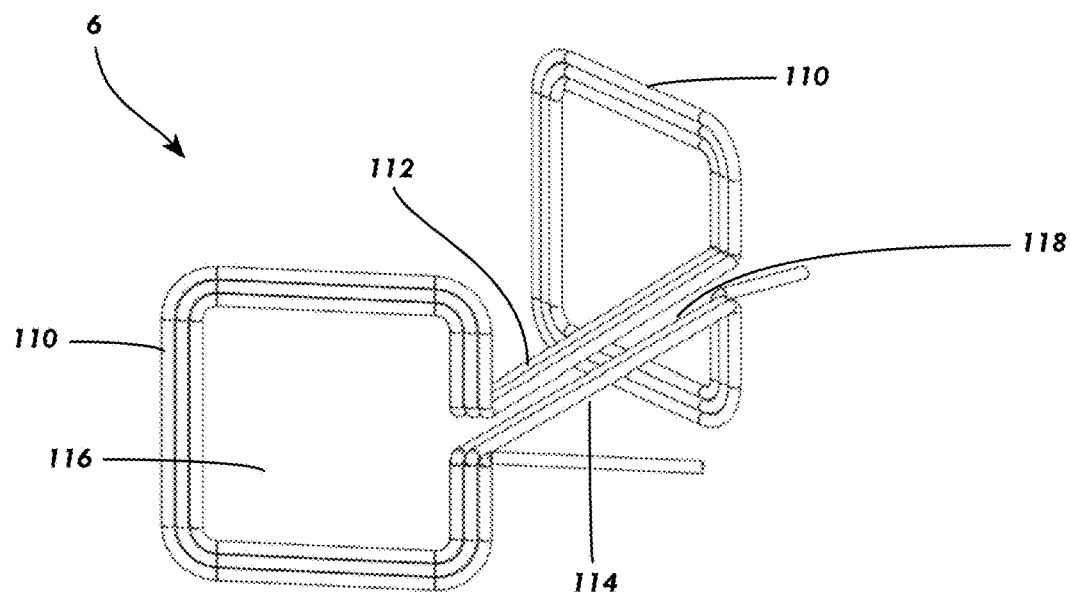
FIG. 5(a) is a side view of a C-coil of a brushless motor according to one embodiment of the present disclosure.
Figure 5B:
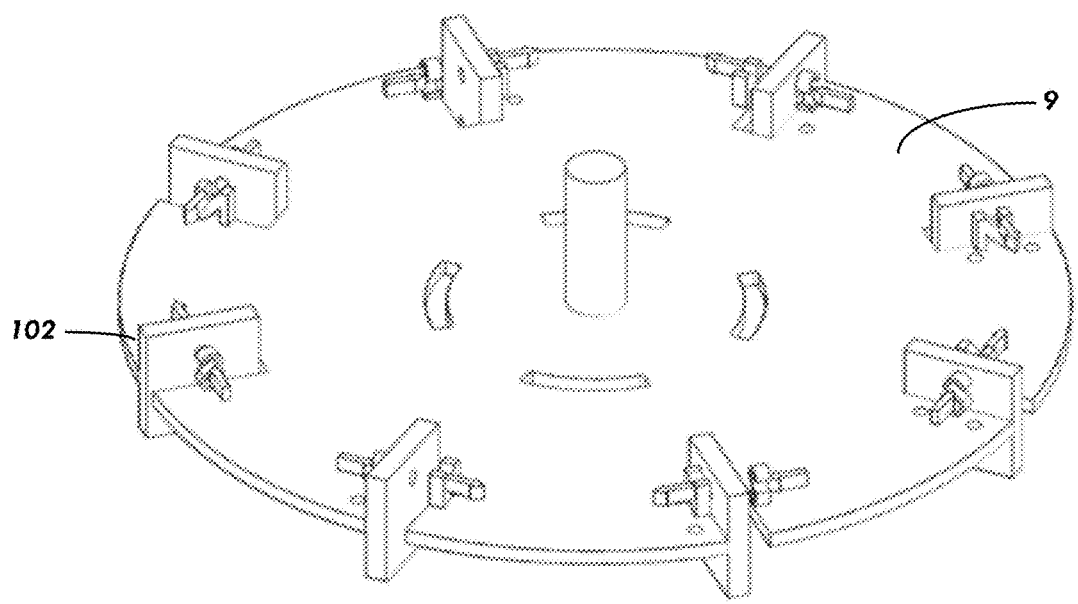
FIG. 5(b) is a perspective view of a rotor disk showing an orientation of permanent magnets of the brushless motor according to one embodiment of the disclosure.
Figure 6A:
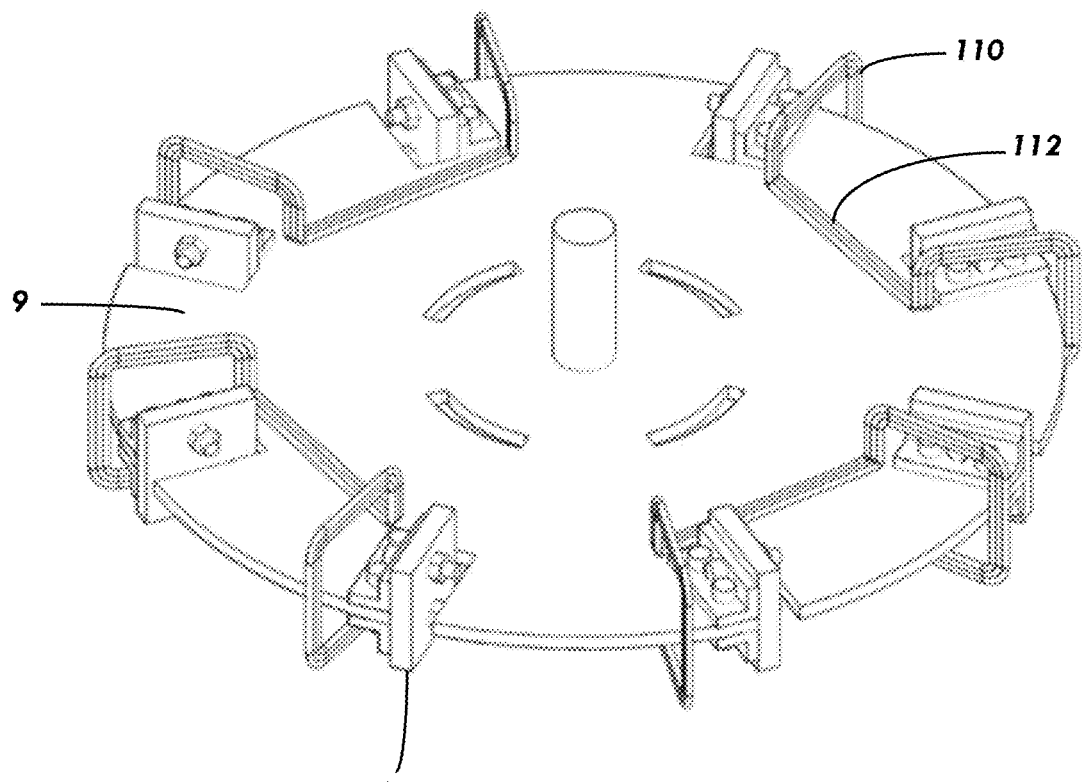
FIG. 6(a) is a perspective top view of a rotor disk and C-coils according to one embodiment of the present disclosure.
Figure 6B:
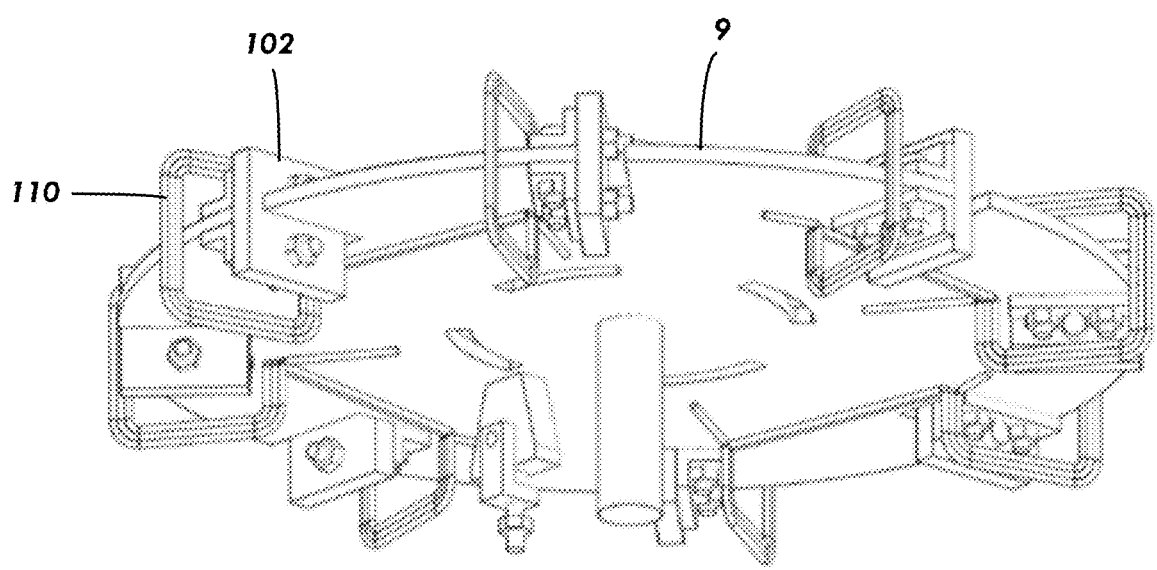
FIG. 6(b) is a perspective bottom view of a rotor disk and C-coils according to one embodiment of the present disclosure.

Referring to FIG. 5(b), an orientation of the permanent magnets 102 mounted around the rotor disk 9 is such that a polarity of each permanent magnet is reversed between any neighboring pair. Specifically, the North face of each individual magnet is oriented toward a neighboring North face, while each South face is oriented toward the South face of its neighboring magnet.

C Coil Pairs

Referring to FIG. 5(a) a single C-Coil pair 6 is shown. Each pair includes two C-Coil loop bodies 110 connected to one another by two legs 112 and 114. The C-Coil loop bodies 110 form a channel 116 having a size that allows the permanent magnet 102 to pass through the channel 116, and the legs 112 and 114 are separated by a gap 118 that is sized to receive a thickness of the rotor disk 9. When viewed from the front, one C-Coil loop is wound in a clockwise direction, while the second is wound in a counterclockwise direction.

Figure 14A:
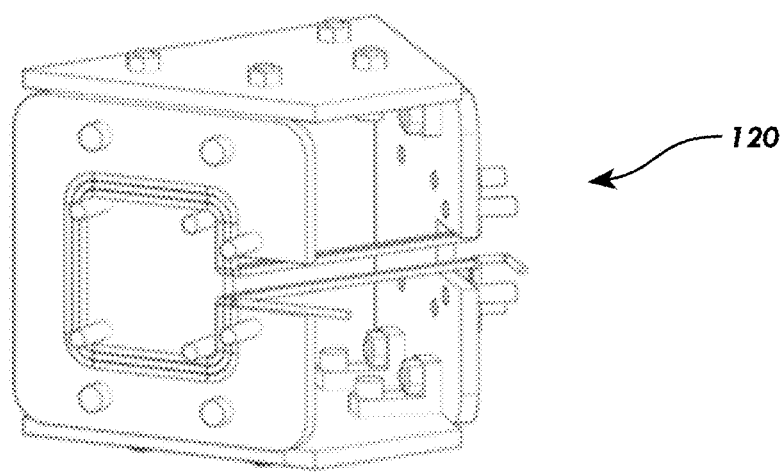
FIGS. 14(a), (b), and (c) show a coil wrapping tool according to one embodiment of the present disclosure.
Figure 14B:
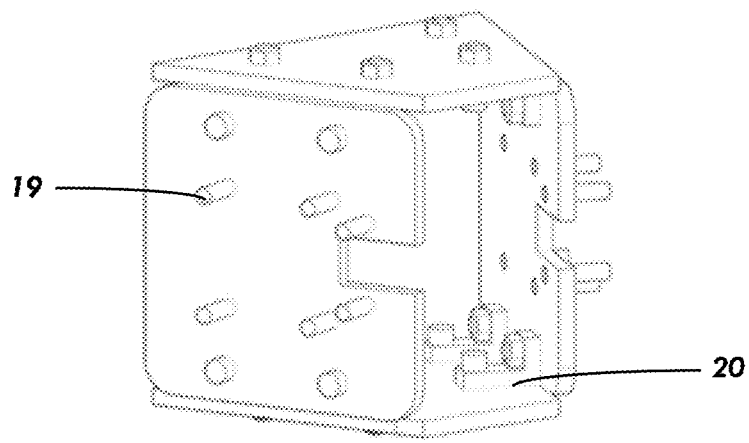
Figure 14C:
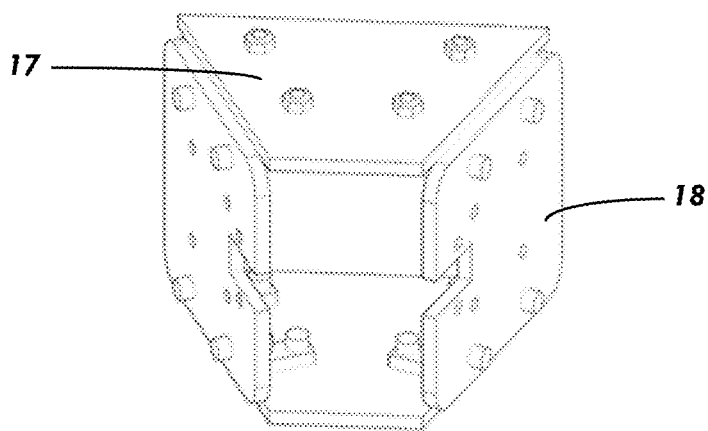

A C-Coil winding tool 120 is shown in FIG. 14(a)-(c). The winding tool 120 includes at least two faces 18 connected by two plates 17 at a top and bottom of the tool and eight L-Brackets 20. Other components and/or adhesives could also be suitable to connect the faces 18 and plates 17 to one another. One or more pegs 19 are mounted on each face 18. Each face 18 of FIG. 14(*a*), for example, includes six pegs 19, four of which are used to mark points along an inner perimeter of the C-coil. The pegs 19 can be arranged such that manufacturing and assembly tolerances are taken into consideration. Pegs 19 can also be used to assist in bending the coil along each of its legs. A slot shaped opening in each face 18 allows the C-coil legs to pass through as the C-coil is being wound.

Figure 19:
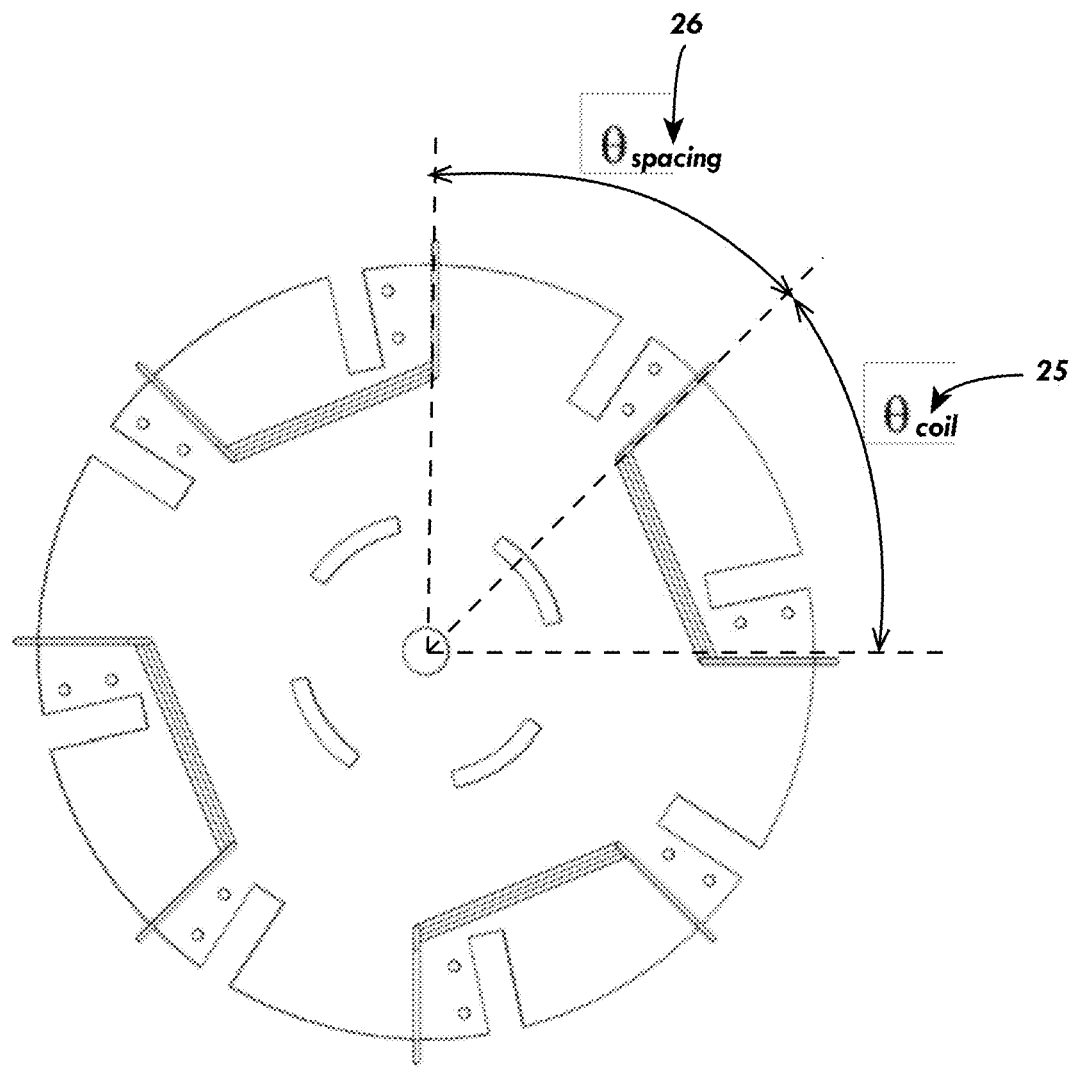
FIG. 19 is a top plan view of a rotor disk and C-coils according to one embodiment of the present disclosure.

As shown in FIG. 19, the C-coils can be wound at a particular angle (theta_coil 25). The value of this angle is dictated by the number of magnet poles:

theta_coil=360 deg/*N*.

The total number of C-coil pairs for a single phase system is typically N/2. Each set of single phase C-coil pairs is preferably arranged uniformly around the rotor, such that the angle between neighboring coils (theta_spacing 26) is:

theta_spacing=360 deg/*N*.

C-Coil Supports

Figure 8:
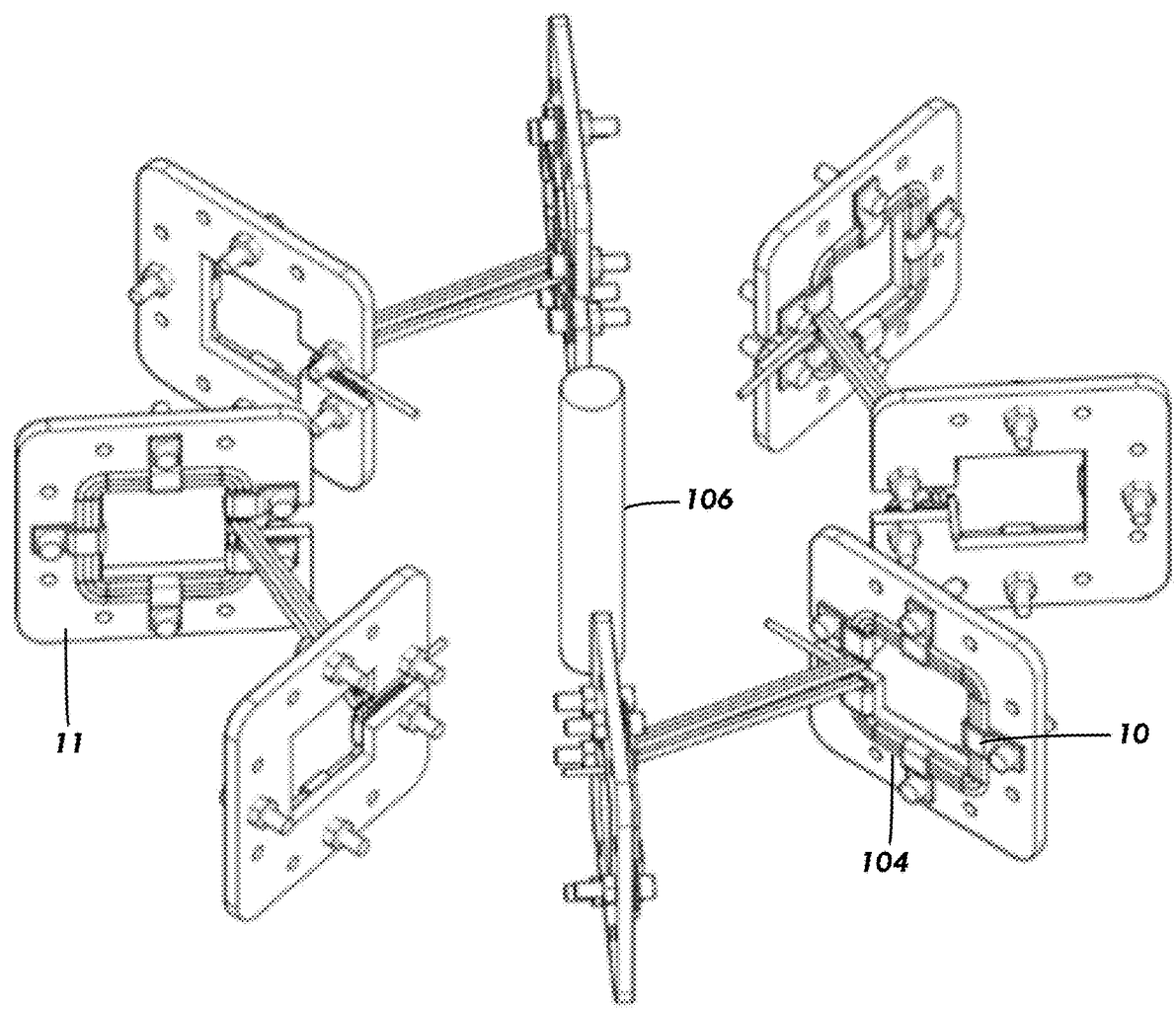
FIG. 8 and FIGS. 9(a) and (b) illustrate a rotor disk including coil supports and supporting hardware according to one embodiment of the present disclosure.

Referring to FIG. 8, C-Coil support plates 11 are shown that are used to reinforce each set of the C-coils. Each support plate 11 includes a central hole and an opening along the interior edge to accommodate the rotor disk 9 and legs of the C-coils. Each support plate 11 can also include one or more through holes that accommodate a C-coil clip mounting and/or L-bracket mounting for connecting to a motor housing.

C-Coil Clips

Referring again to FIG. 8, the C-coils can be retained against the support plates 11 by one or more C-Coil clips 10. The total number of clips needed can be adjusted as required (e.g., according to motor design, user preference). For illustration purposes, five C-coil clips 10 are shown in FIG. 8 for each individual C-Coil body.

C Coil Support Plate L-Brackets

Figure 3:
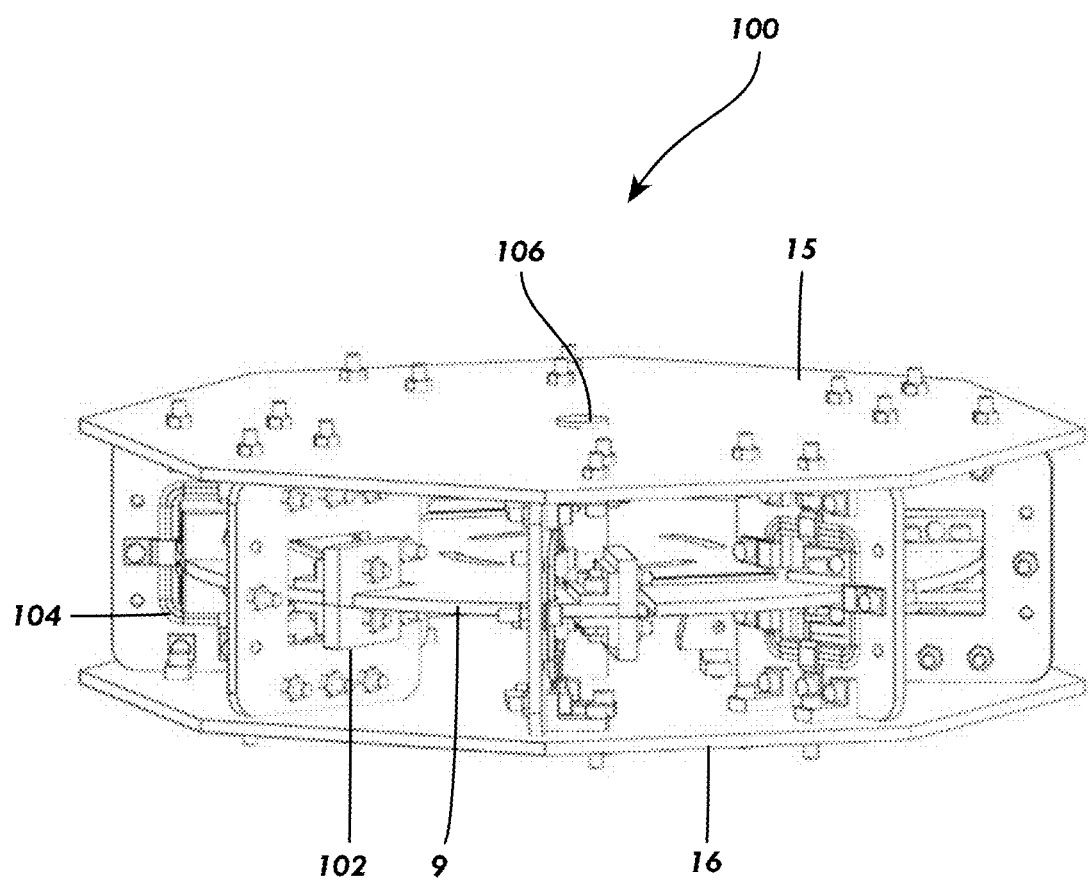
FIG. 3 is a side view of a brushless motor according to one embodiment of the present disclosure.
Figure 9A:
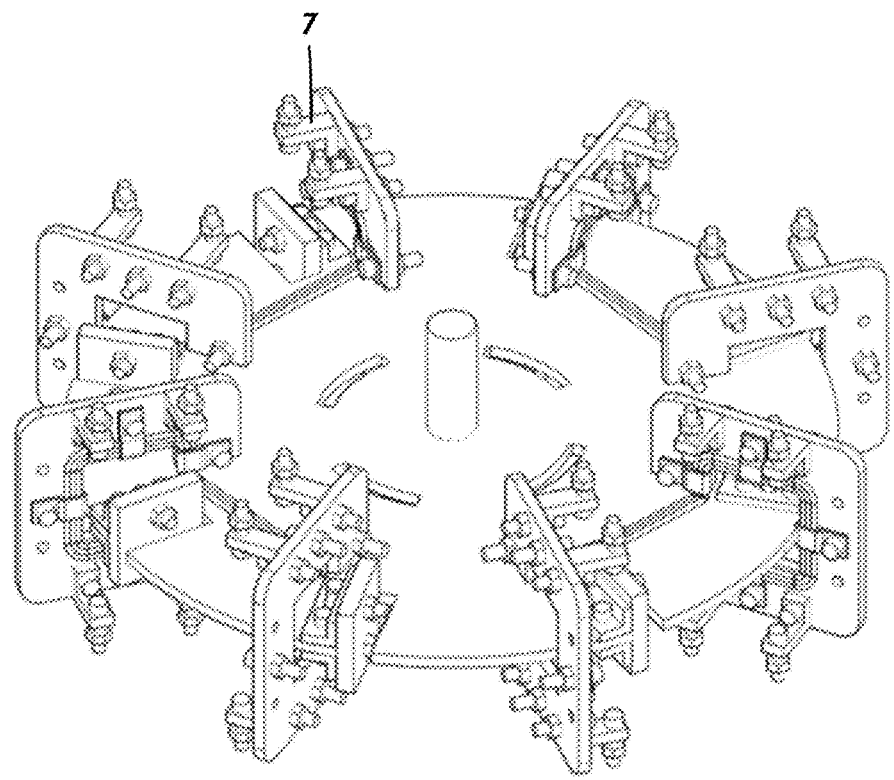
Figure 9B:
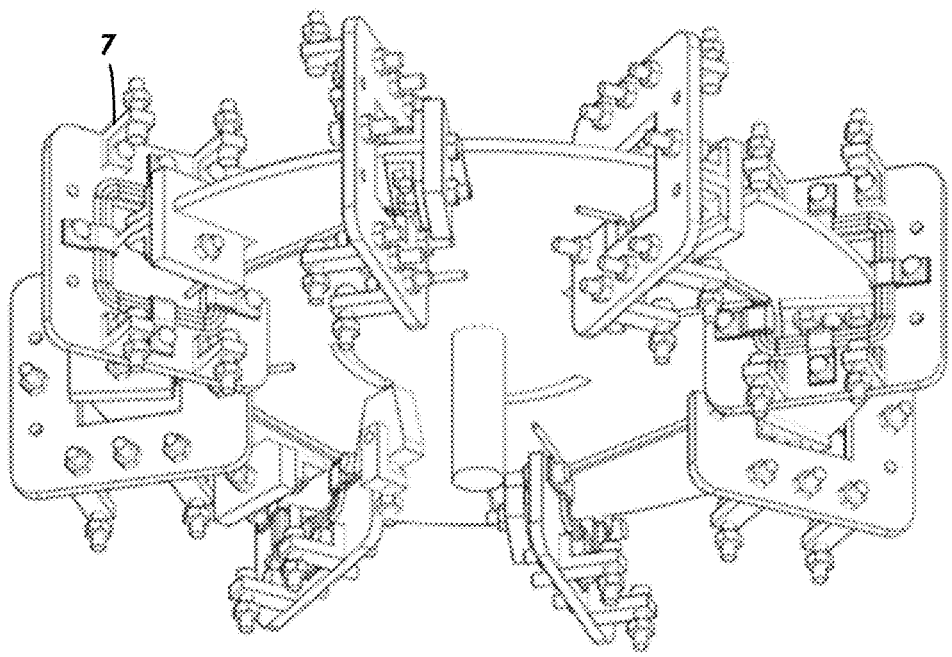
Figure 11:
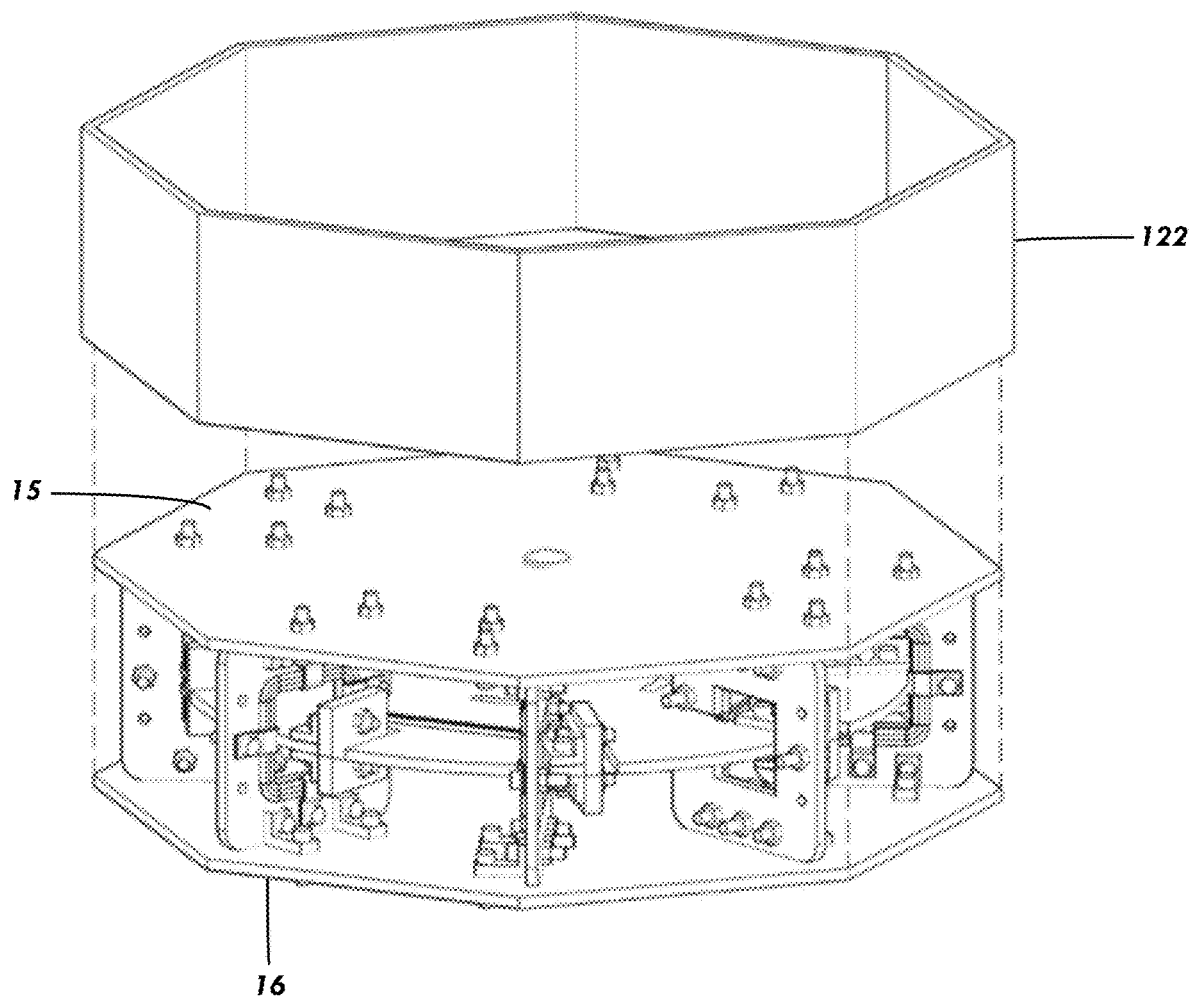
FIG. 11 shows a perspective view of a brushless motor including top and bottom plates according to one embodiment of the present disclosure.

Referring to FIGS. 9(*a*) and 9(*b*), C-coil support plate L-brackets 7 are shown. Each C-coil support plate L-bracket 7 can include one or more holes on each of adjacent faces of the C-coil support plate L-brackets. For example, the C-coil support plate L-brackets 7 of FIG. 9(*b*) have a single hole on each face. Screws, nuts, bolts, etc., may be used to mount the C-coil support plate L-brackets 7 to the C-coil support plate 11 and a motor housing. FIGS. 3 and 11 illustrate how the L-brackets 7 can be mounted to top and bottom plates of a motor housing.

Optical Sensor and Slots

As shown in FIG. 21, a width of each optical sensor slot 14 in an inner circle (theta_optical_slot1 37) is typically equal to theta. Starting edges of these optical sensor slots 14 may align with a middle of a rotor magnet slot width 55. This prevents the C-coil from switching too soon, i.e. stop pulling before the magnet reaches the center of the coil, or too late, i.e. continue pulling the magnet after it has passed through the center of the coil, which leads to inefficiencies as discussed in greater detail below.

Figure 20:
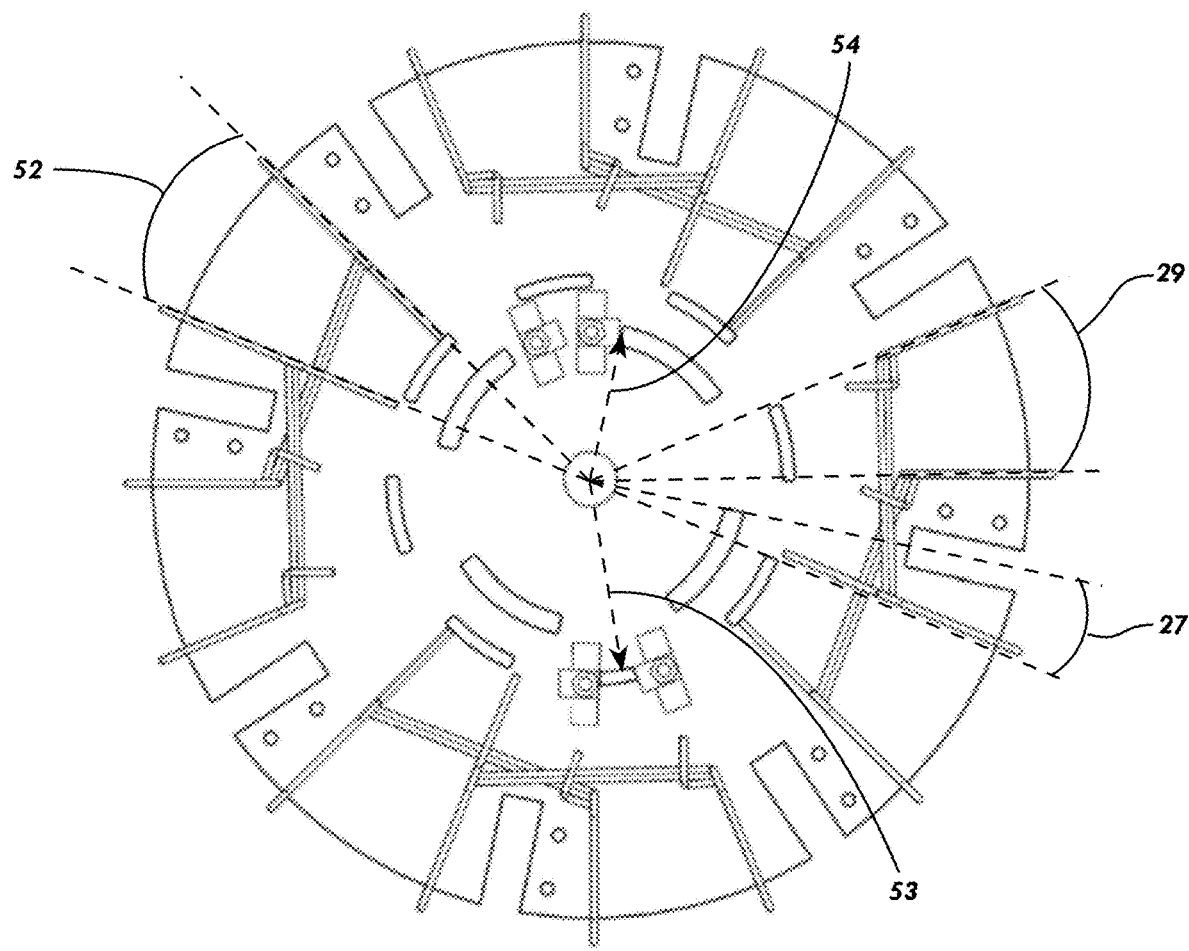
FIG. 20 is a bottom plan view of a rotor disk and interleaved C-coils according to one embodiment of the present disclosure.

In some embodiments, a total number of optical sensor slots 14 in an inner circle of the rotor disk 9 is equal to one half the total number of magnets mounted on the rotor (i.e., N/2). FIG. 20 is a more detailed view of a rotor that includes an inner circle of optical slots having a first radius (radius_optical_slot1 54) and an outer circle of optical slots having a second radius (radius_optical_slot2 53). Slots within each circle can also have unique widths (e.g., theta_optical_slot1 37, theta_optical_slot2 52). Further, optical slots in an outer circle of the rotor may be offset from optical slots of the inner circle by a predetermined offset (theta_optical_slot2_offset 27).

Bipolar Circuit Operation

Figure 12:
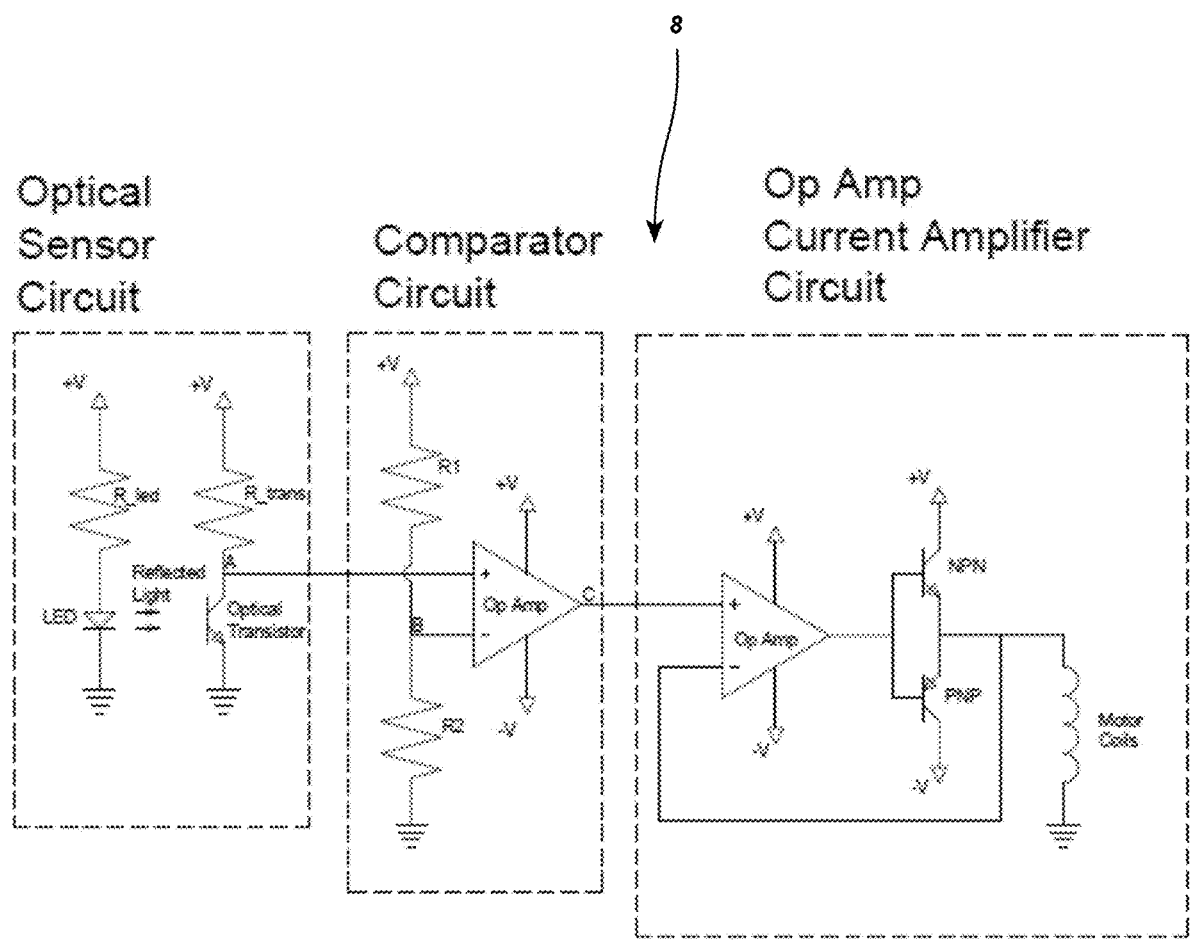
FIG. 12 is a diagram of a bipolar motor control circuit according to one embodiment of the present disclosure.
Figure 29:
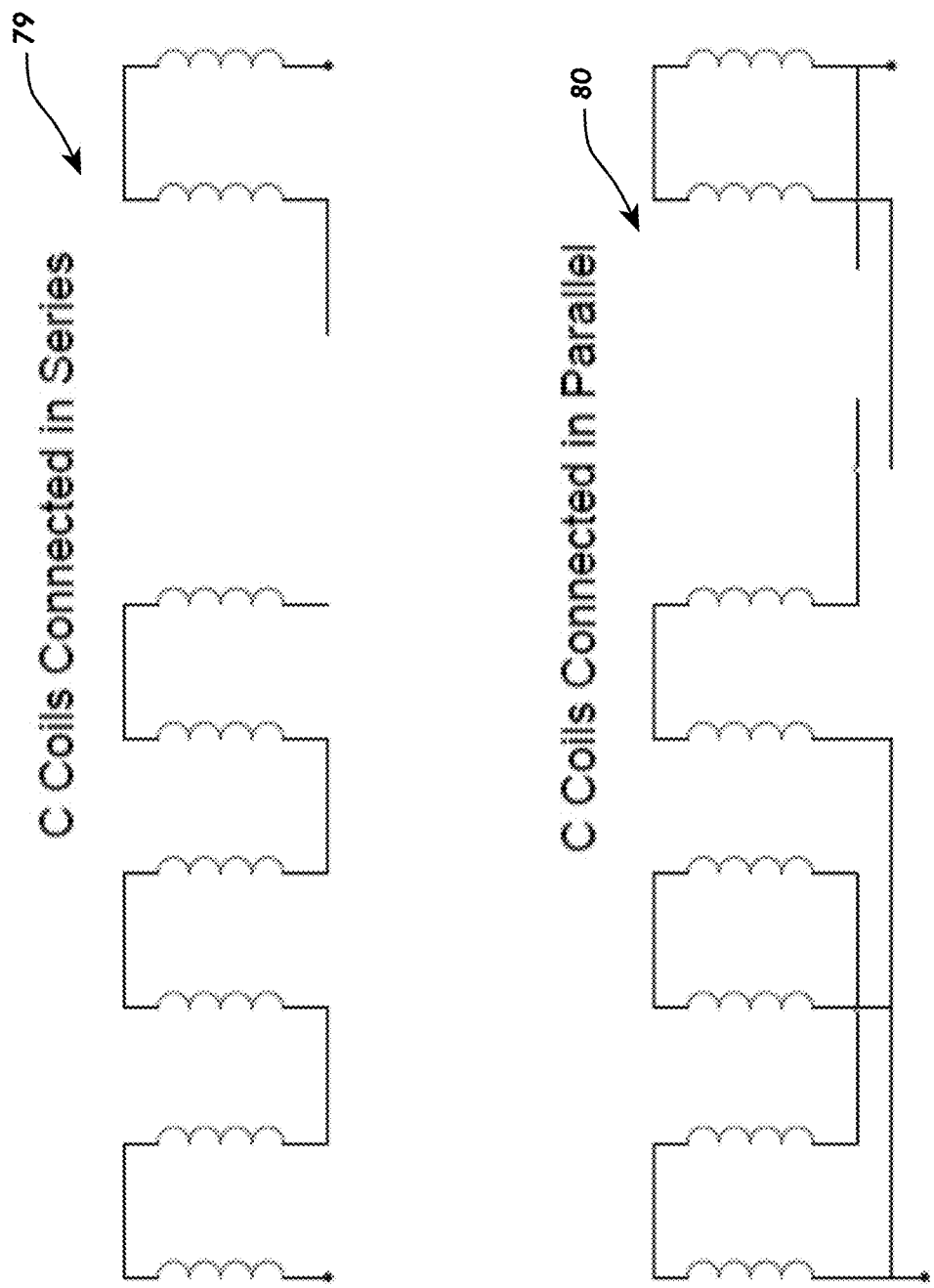
FIG. 29 is a diagram of phase i C-coil series or parallel wiring according to embodiments of the present disclosure.

Referring to FIG. 12, point A of an output transistor of an optical sensor is wired into a non-inverting (i.e., "+") input of an Op Amp Comparator circuit. A voltage divider can be used to provide an inverting (i.e., "−") input to the Op Amp comparator circuit. A reference voltage (V_ref) at point B of FIG. 12 of the voltage divider should be less than a circuit voltage supply (V) and greater than the optical sensor transistor output voltage at point A. When the rotor disk 9 reflects light (e.g., from a light emitting diode) back toward the optical sensors, the comparator circuit output voltage is −V. This occurs when a light source of the optical sensor is not aligned with the rotor slots. See, for example, FIG. 24, which illustrates light that is redirected toward the optical sensor (Section B-B) and light that emerges through a rotor slot (Section A-A). The comparator circuit's output point C is in turn wired into a bipolar op amp current amplifier circuit. As shown in FIG. 29, C-Coil leads can be wired in series 79 or parallel 80 at an emitter output of NPN and PNP transistors.

Bipolar Motor Operation

Figure 7A:
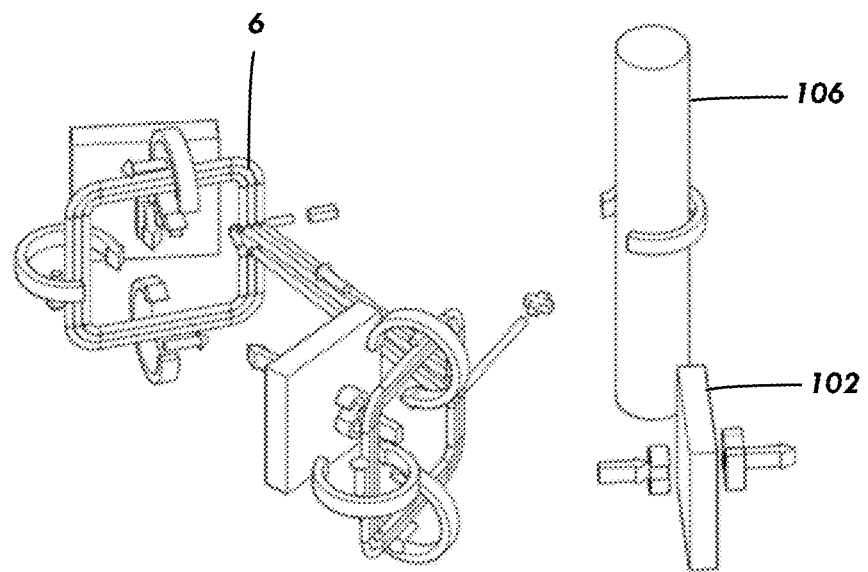
FIGS. 7(a) and 7(b) illustrate bipolar operation of the brushless motor according to one embodiment of the present disclosure.
Figure 7B:
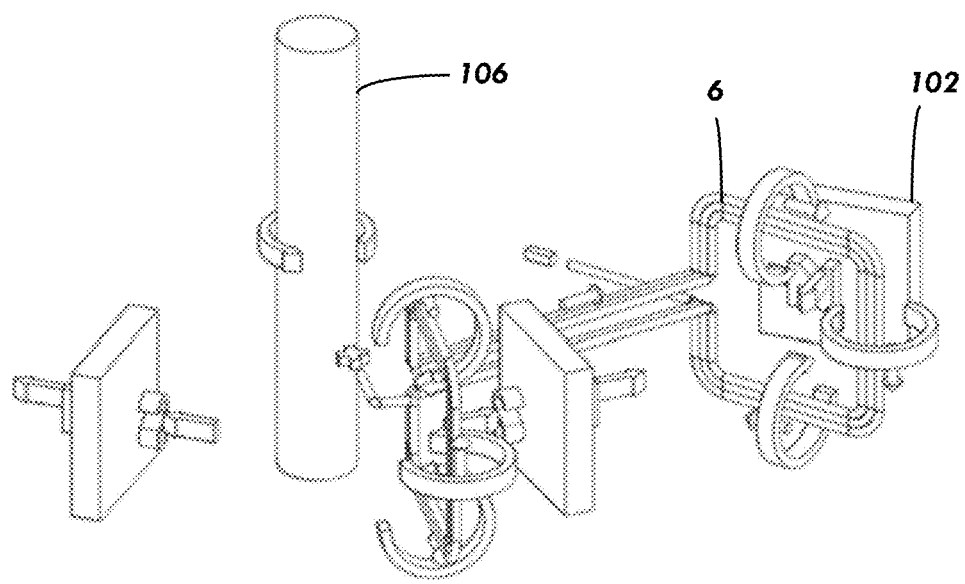
Figure 23:
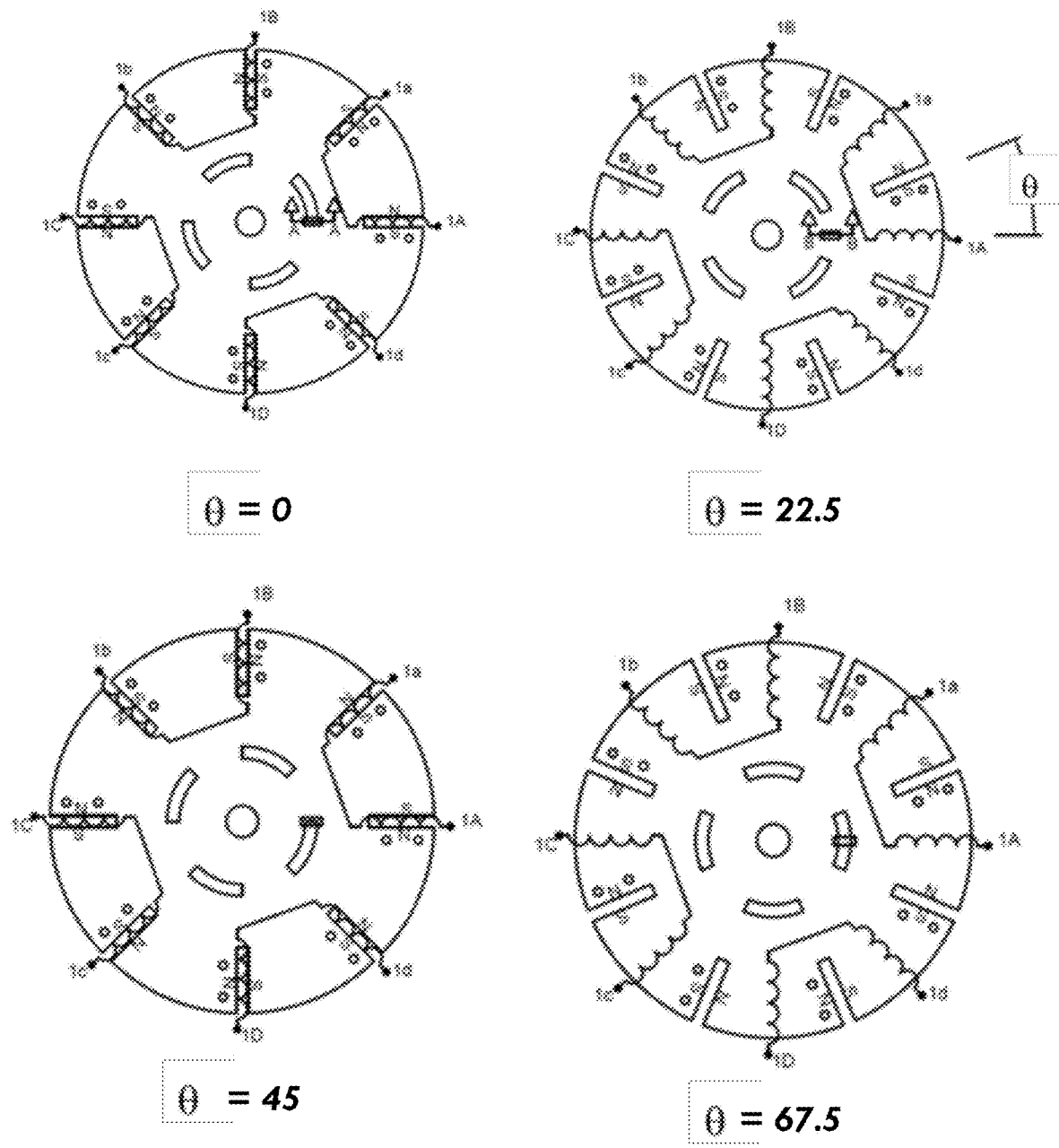
FIG. 23 illustrates a rotor disk with single phase C-coils as the rotor disk rotates according to one embodiment of the present disclosure.

When power is applied to the circuit, the optical sensor has a view through the optical slot 14 of the rotor disk 9 at least some of the time (e.g., FIG. 23 where theta equals 67.5°). When the optical sensor has a view through the optical slot 14, an output of the comparator circuit is high +V. The comparator consequently outputs a +V signal to a current amplifier circuit and current flows through an NPN transistor and into C-coils of the motor. Permanent magnets on the rotor disk 9 are repelled by a C-coil positioned directly behind them, while also being pulled by a C-coil positioned directly in front of the permanent magnet, as shown in FIG. 7A. The permanent magnets continue moving toward C-coils that are attracting them until each individual permanent magnet is substantially aligned with a center of a C-coil attracting the permanent magnet, as shown in FIG. 23, where theta equals 0°. The permanent magnets all reach this point substantially simultaneously due to substantially equal angular arrangement of the permanent magnets and C-coils. The optical rotor slot 14 in front of the optical sensor will have moved so that the a solid portion of the rotor disk reflects light back toward the optical sensor. This causes the optical sensor signal to generate a low value, which in turn flips a comparator output to −V. In response, the current amplifier circuit reverses a direction the current is flowing in each C-coil. Momentum of the permanent magnets rotating on the rotor disk 9 carries the permanent magnets through a center of the C-coils until the permanent magnets are repelled by the C-coil that is now behind them and pulled by the C-coil now in front of them, as shown in FIG. 23 where theta equals 22.5°. Motion of the rotor can continue on in this manner as illustrated by FIGS. 7 and 23.

Unipolar Circuit Operation

Figure 13:
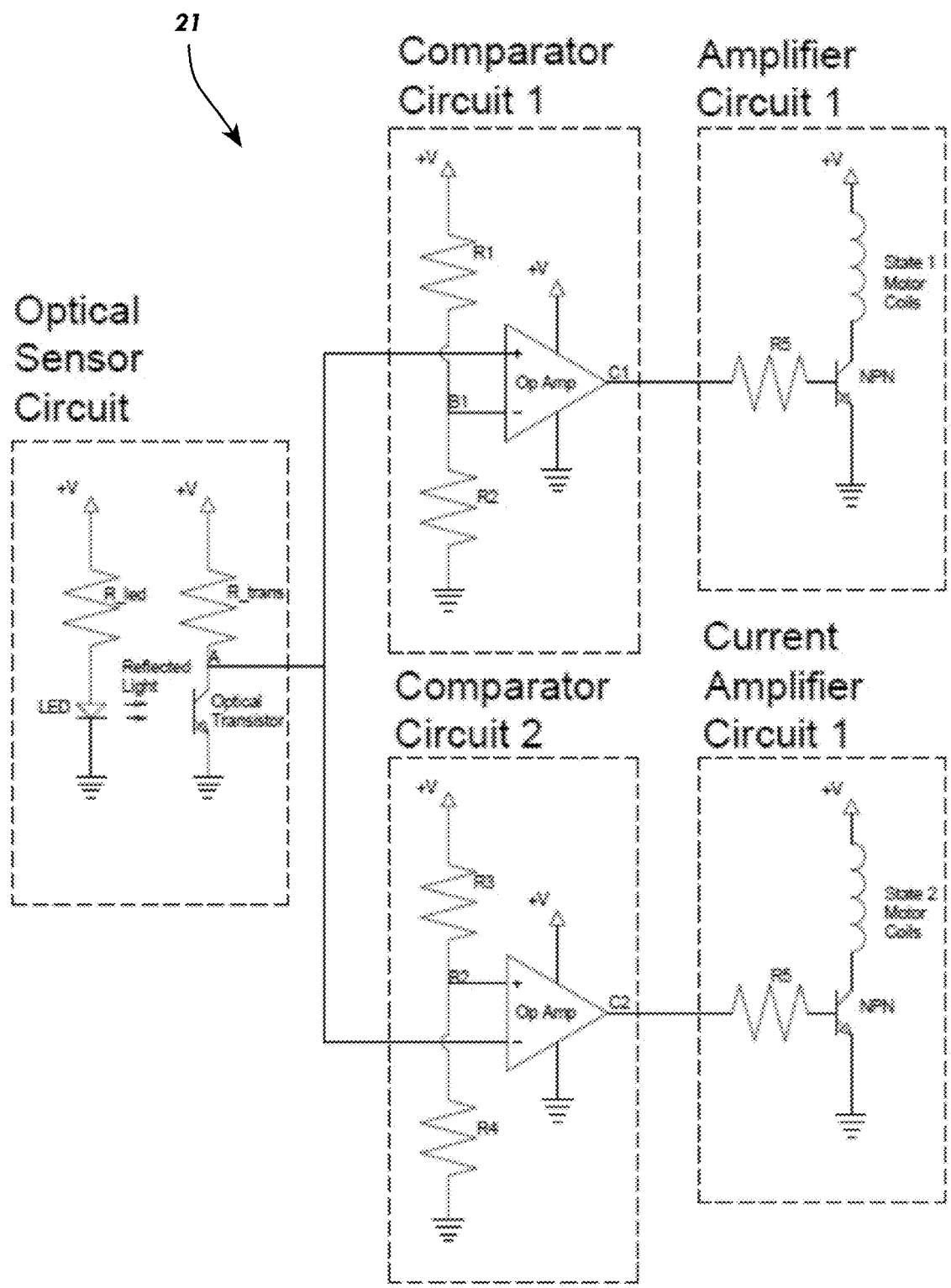
FIG. 13 is a diagram of a unipolar motor control circuit according to one embodiment of the present disclosure.

The optical sensor typically switches when all of the permanent magnets are positioned within the C-coils. Referring to FIG. 13, an output transistor of the optical sensor at point A is wired into a non-inverting input of a state 1 comparator circuit op amp and an inverting input of a state 2 comparator circuit. In some embodiments, a voltage divider is used to provide the inverting input of the state 1 comparator circuit op amp and the non-inverting input of the state 2 comparator circuit op amp. A reference voltage (point B1 of FIG. 13) of the state 1 voltage divider should be less than the circuit voltage supply (V) and greater than an output voltage of the optical sensor (i.e., point A of FIG. 13) when the rotor disk 9 is reflecting light back toward the optical sensor. That is, when the optical sensor is not aligned with one of the optical rotor slots 14. A reference voltage (i.e., point B2 of FIG. 13) of the state 2 voltage divider should be greater the optical sensor transistor output voltage (i.e., point A of FIG. 13) when the rotor disk 9 is reflecting light back toward the optical sensor. An output signal (i.e., point C1 of FIG. 13) of the state 1 comparator provides voltage to a base of a state 1 NPN transistor. An output signal (point C1 of FIG. 13) of the state 2 comparator provides voltage to a base of state 2 NPN transistor. As shown in FIG. 29, state 1 C-Coil leads can be wired in series 79 or parallel 80. Generally, one lead is attached to a +V power supply and the other lead is connected to a collector of the state 1 NPN transistor. Similarly, state 2 C-Coil leads can also be wired in series or parallel. One lead is attached to the +V power supply, while the other lead is connected to a collector of the state 2 NPN transistor.

Unipolar Motor Operation

Figure 10A:
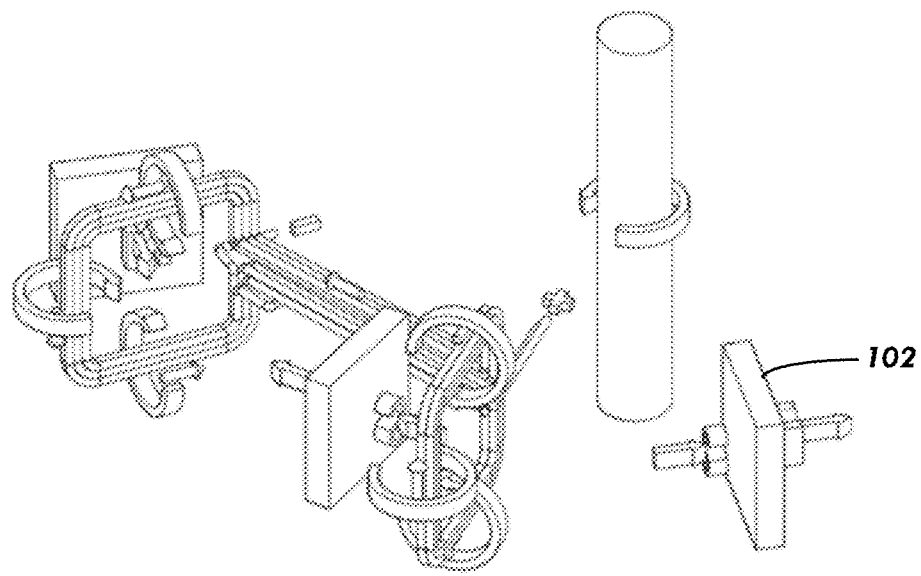
FIGS. 10(a) and 10(b) illustrate unipolar operation of the brushless motor according to one embodiment of the present disclosure.

When power is applied to the circuit, the optical sensor has a view through one of the optical rotor slots 14 at least some of the time (e.g., FIG. 23 where theta equals 67.5°). At this point in time, an output is high +V. The state 1 comparator will output a +V signal to the state 1 NPN transistor and current flows through the state 1 coils. At the same time, the state 2 comparator will output 0V to the state 2 NPN emitter and no current flows through the state 2 coils. This causes the permanent magnets on the rotor disk 9 to be repelled by the state 1 C-coil directly behind the permanent magnets and drawn toward (i.e., attracted by) the state 1 C-coil directly in front of them, as shown in FIG. 10A. The magnets continue moving toward the coils that are attracting them until each individual magnet is in the center of the coil. The magnets typically reach this point substantially simultaneously due to their arrangement described above.

Figure 10B:
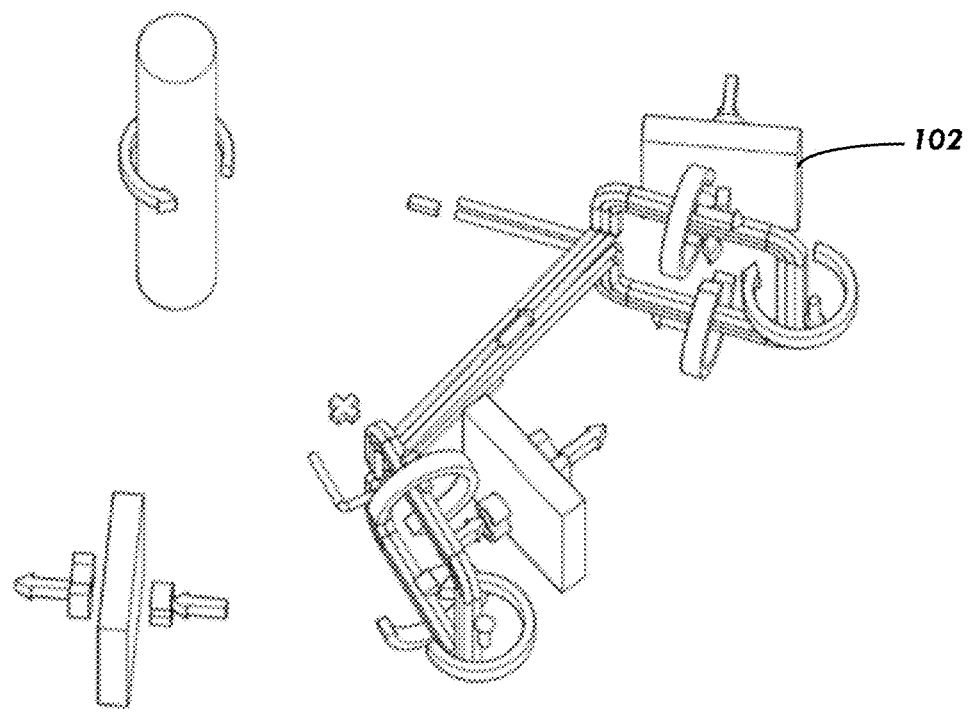

The optical rotor slot 14 in front of the optical sensor will have moved so that a solid portion of the rotor disk 9 now reflects light back toward the optical sensor. This causes the state 1 comparator signal to go low (e.g., approximately 0V), and the state 1 NPN transistor prevents current from flowing through the state 1 C-coils. An output signal of the state 2 comparator, meanwhile, registers a high value, and the state 2 NPN transistor allows current to start flowing through the state 2 C-coils. Leads of the state 2 coils are wired opposite to the state 1 coils so that this change in signal causes current to flow in an opposite direction. Momentum of the permanent magnets on the rotor disk 9 carries them through the center of the state 1 and 2 C-coils until they find themselves being repelled by the state 2 C-coil now behind them and pulled by the state 1 coil in front of them, as shown in FIG. 10B. Motion of the rotor disk 9 can continue on in this manner.

Torque Ripple

Figure 25:
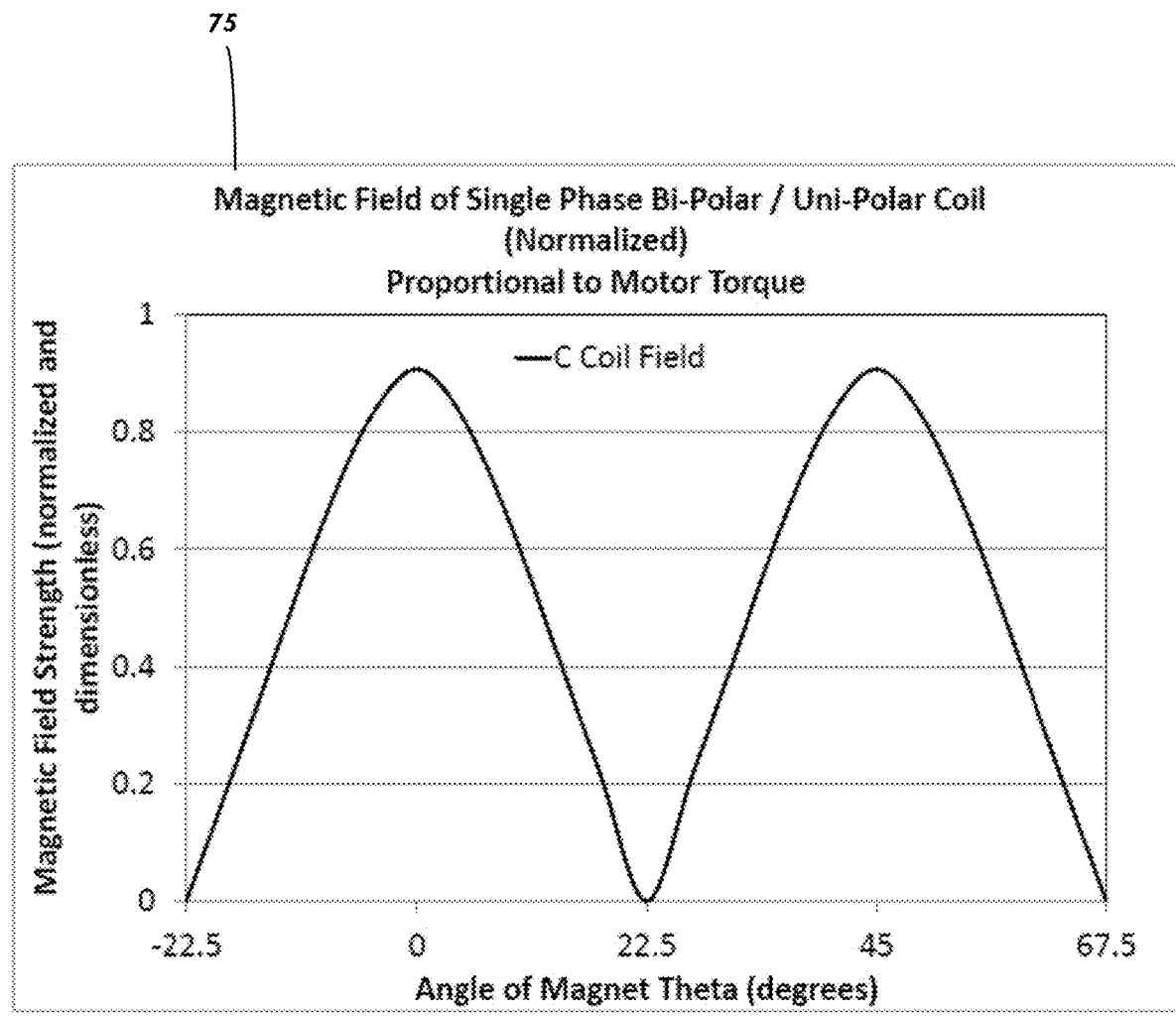
FIG. 25 is a graph of a magnetic field of a single phase C-coil brushless motor according to one embodiment of the present disclosure.

Variation of the magnetic field around the circumference of the rotor of a single phase set of coils for an eight pole rotor is seen in FIG. 25. Because each C-Coil pair operates like a Helmholtz coil pair in quadrature, there is a point in between each system and neighboring pair of C coils, where the magnetic field largely cancels out. Oftentimes, the torque output of the rotor is proportional to the magnetic field. The torque ripple 75 can be reduced with the addition of a second set of coils as will be further described in the next section.

A motor housing (FIG. 11) including an outer wall 122, top plate 15, and bottom plate 16 can be cast, machined or bent non-ferrous metals, such as aluminum. Top and bottom plates of the motor housing typically include through holes for mounting the coil support L-brackets. The bottom plate may include one or more additional holes for mounting the optical sensor bracket. The motor housing can be shaped for a specific application; for instance, the housing for an electric bicycle motor could also be the bicycle chain guard.

Electric Generator Operation

Figure 15:
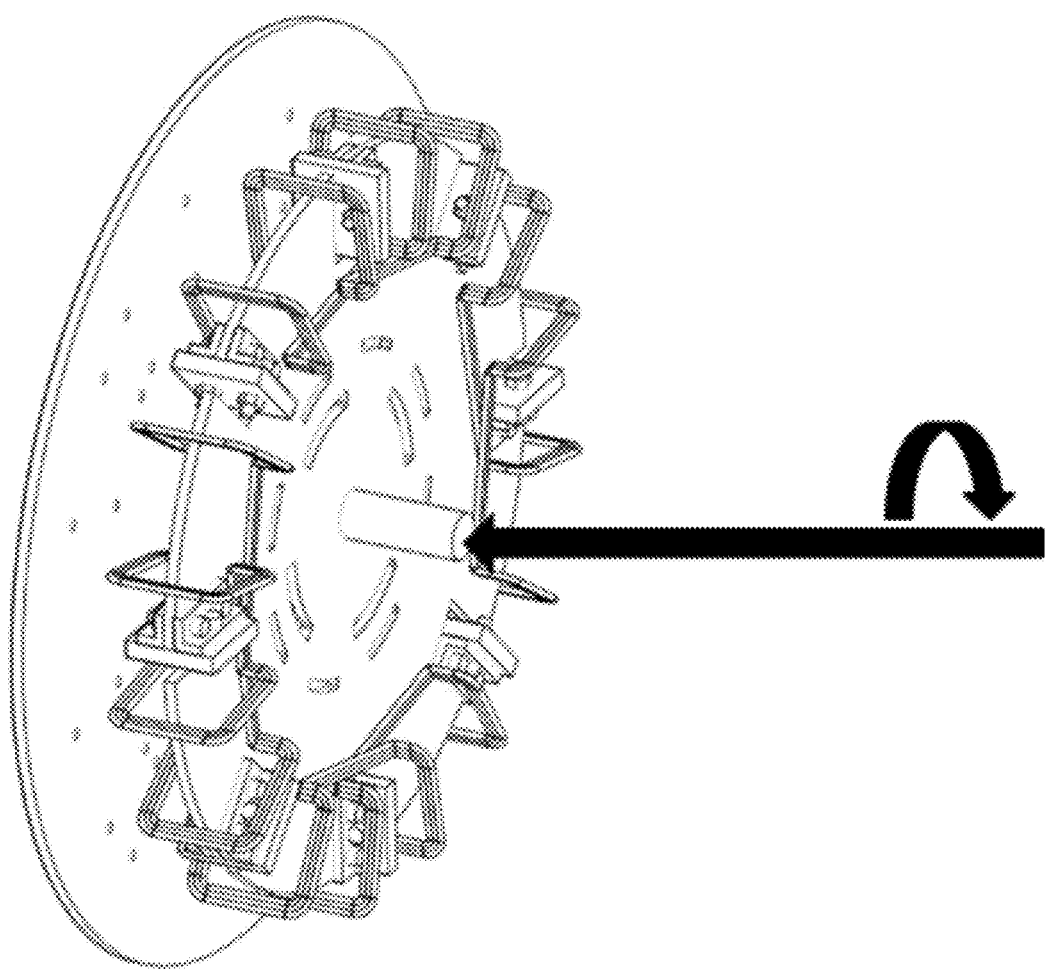
FIG. 15 illustrates a brushless motor configured as a generator according to one embodiment of the present disclosure.
Figure 16:
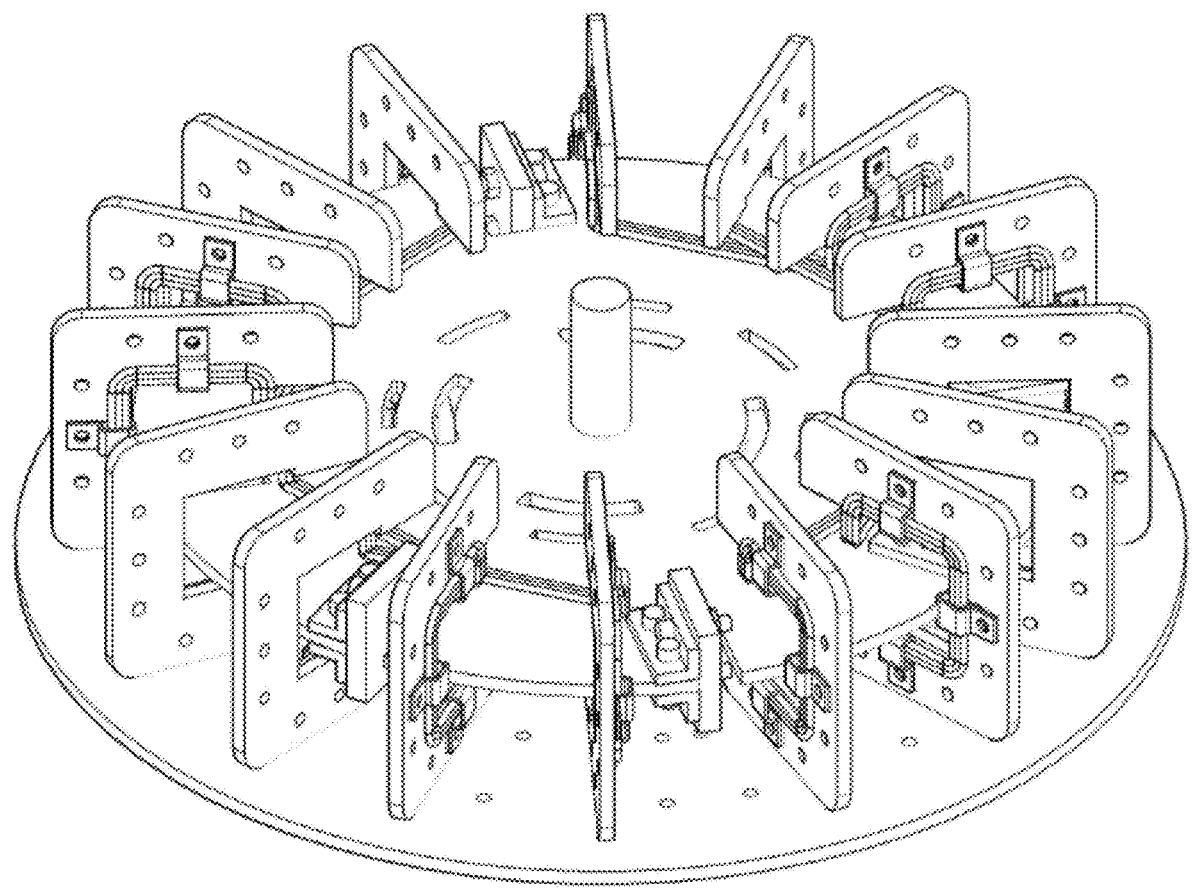
FIG. 16 shows a brushless motor including interleaved coils according to one embodiment of the present disclosure.
Figure 17:
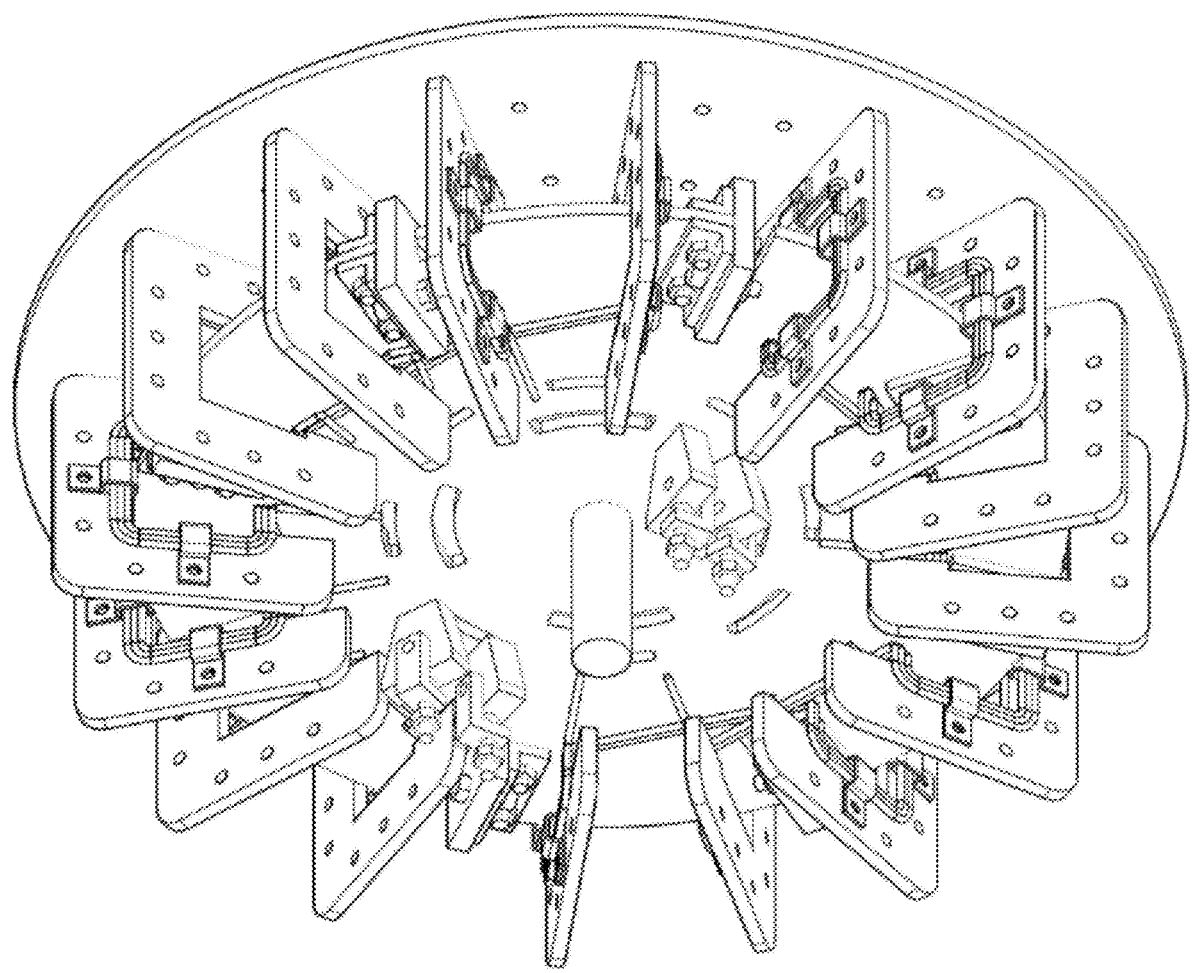
FIG. 17 is a perspective bottom view of a brushless motor including interleaved coils according to one embodiment of the present disclosure.

Referring to FIG. 15, a shaft of the rotor disk 9 can be coupled to another shaft that is turning due to stored or kinetic energy. For instance, dammed water flowing over a turbine, heated gas from coal, natural gas or nuclear power sources, etc., may serve as stored energy sources. Wind turning propellers mounted on a shaft, for example, can provide a kinetic energy source. Voltage is generated by the rotating magnets and may be drawn from the system from the C-Coil leads.

Interleaved Coil Configuration, Construction and Operation

Coil Arrangement

Figure 18:
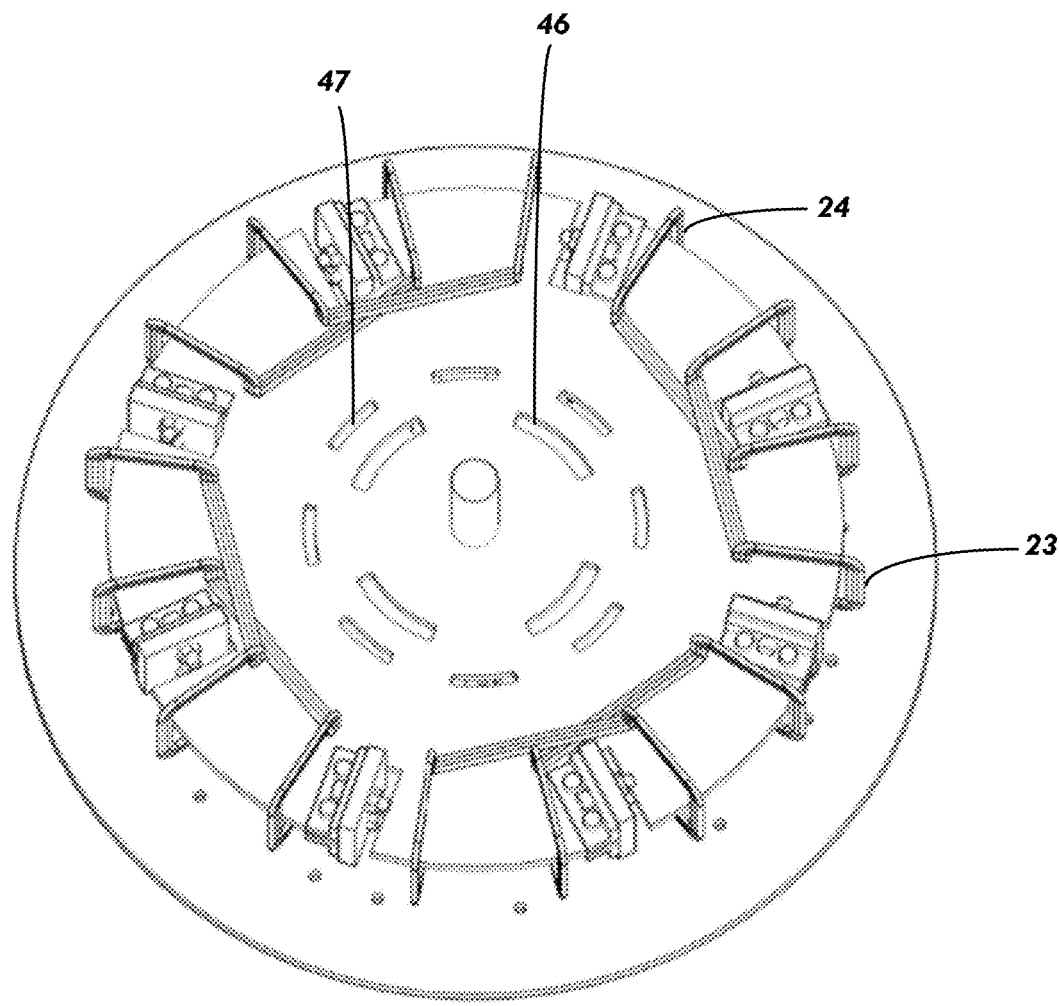
FIG. 18 is a top view of a brushless motor including interleaved coils and a rotor disk according to one embodiment of the present disclosure.

As shown in FIG. 18, a second set of C-coils may be added to motor to reduce torque ripple. The C-coil sets are denoted as Phase I C-coils 23 and Phase II C-coils 24. Both sets of C-coils are uniformly spaced circumferentially around an outer edge of the rotor disk 9. As seen in FIG. 19, an angle between the "C" loops of an individual coil is theta_coil 25=theta. A spacing angle between neighboring Phase I coils is theta_spacing 26=theta. Referring to FIG. 20, the Phase I and Phase II C-coils are offset by angle theta_interleaved_offset 29. Here, theta_interleaved_offset 29 equals theta/2.

Figure 22:
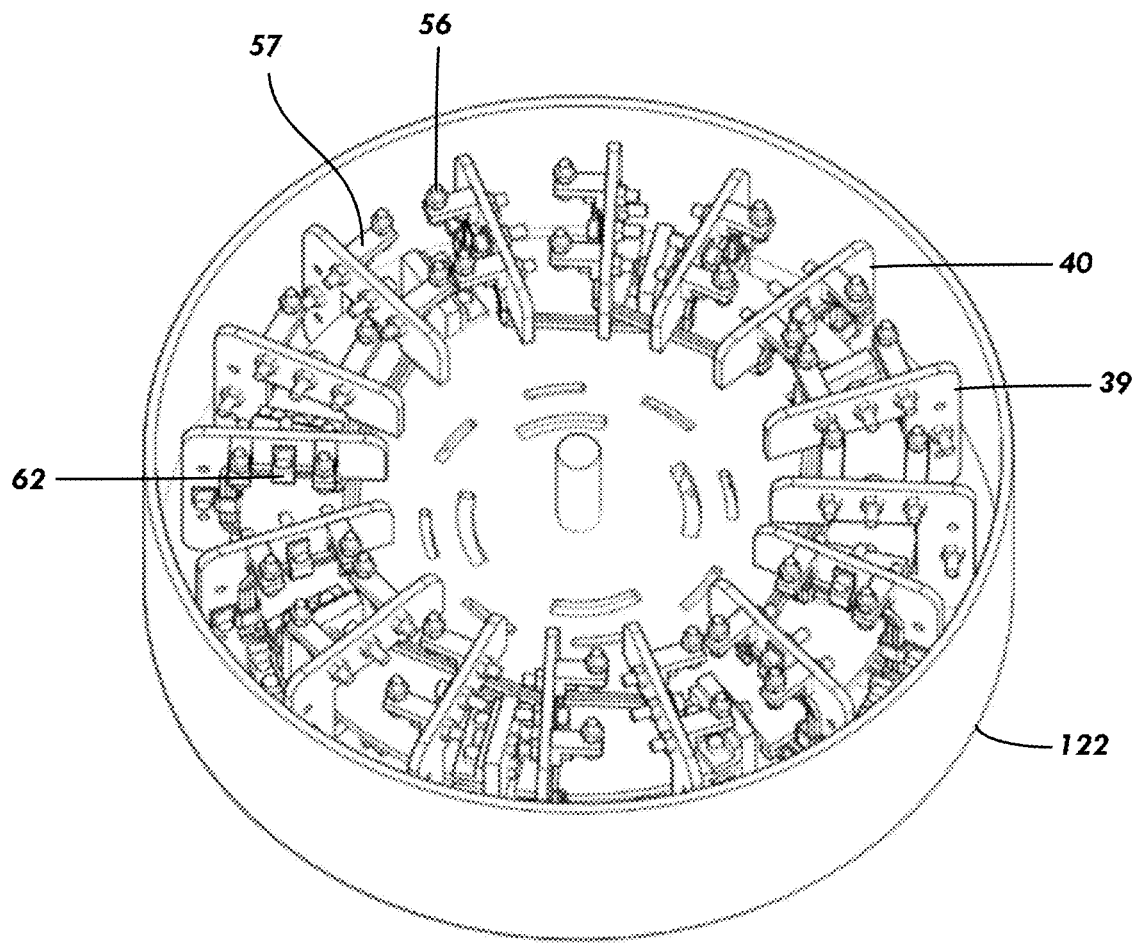
FIG. 22 is a top perspective view of a brushless motor having interleaved coils according to one embodiment of the present disclosure.

Generally, both Phase 1 and Phase II C-coils are supported by support plates 39 and 40 as seen in FIG. 22. L-brackets 56 and 57 can be used to mount the support plates 39 and 40 to top and bottom motor housing plates. Lastly, coil clips 62 may be used to hold C-coils on to their respective support plates.

Optical Sensor and Slots

As shown in FIG. 21, the width of each optical sensor 1 slot (theta_sensor1 37) is equal to theta. The starting edge of each alignment of sensor 1 slot 38 typically aligns with the middle of the rotor magnet slot width 55. In some embodiments, a total number of sensor 1 slots is equal to one half the total number of magnets mounted on the rotor disk 9 (i.e., N/2). However, the rotor disk 9 could include fewer or a greater number of sensor 1 slots. FIG. 20 depicts a radius of the optical slots 14 and sensor 1 radius_slot1 54. Included in FIG. 20 is the radius of the slots and sensor 2 radius_slot2 53. The total number of sensor 2 slots is generally equal to the number of magnets mounted on the rotor (i.e., N), and the sensor 2 slots are usually evenly spaced. The width of sensor 2 slots is represented by theta_slot2_radius 52 and the starting edge alignment offset from sensor 1 slots is theta_slot2_offset 27. The alignment (i.e., sensor 2 offset alignment) could be, for example, equal to theta/4.

Figure 26:
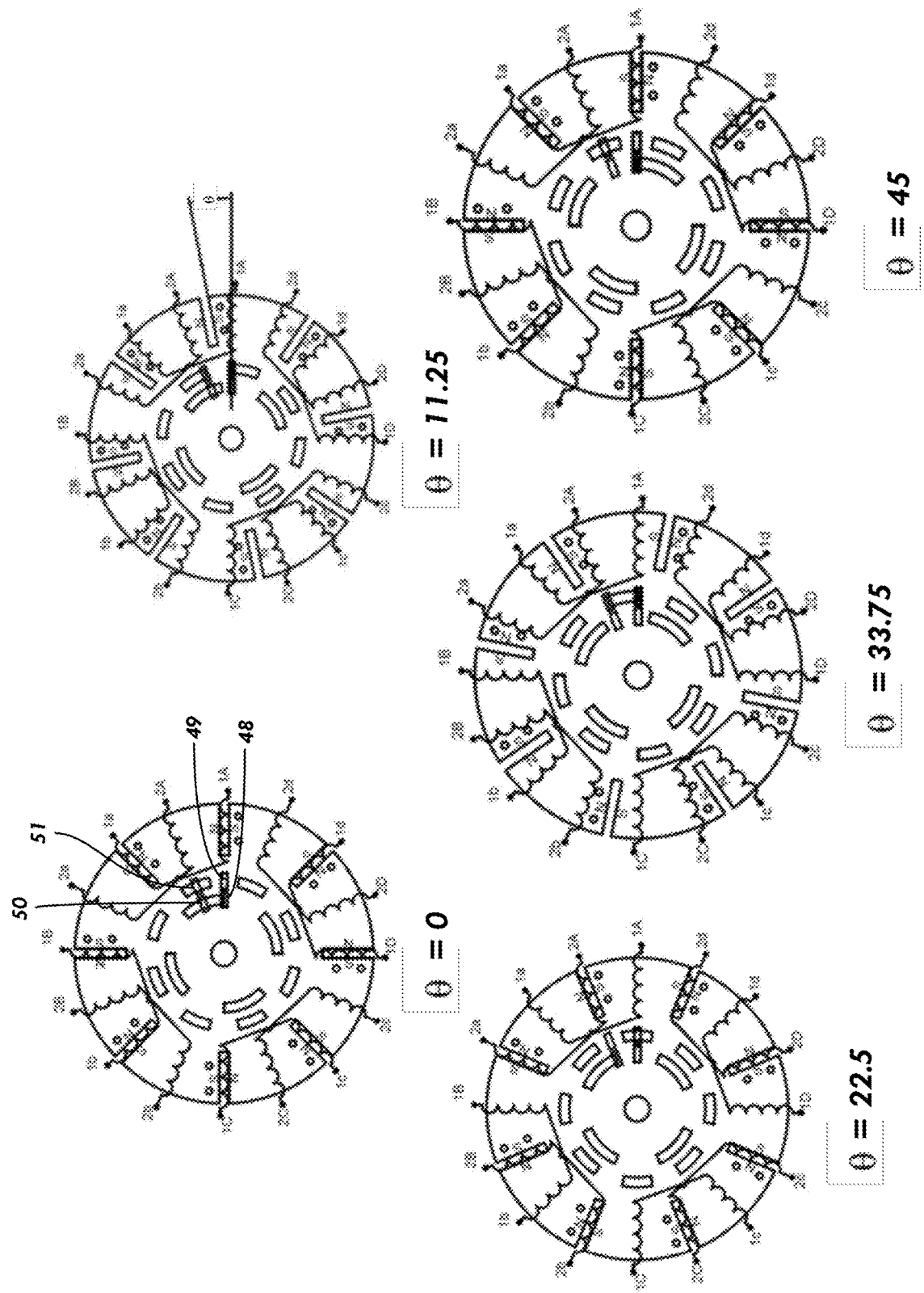
FIG. 26 illustrates a rotor disk with two-phase C-coils as the rotor disk rotates according to one embodiment of the present disclosure.

There are 2 optical sensors for each set of coil phases. As shown in FIG. 26, Phase 1 Optical sensor 1 48 and optical sensor 2 49 may both be in line with the same Phase 1 C-coil element. Similarly, Phase 2 optical sensor 1 50 and sensor 2 51 can be in line the same Phase 2 C Coil element.

Interleaved Circuit Configuration and Operation

Figure 24:
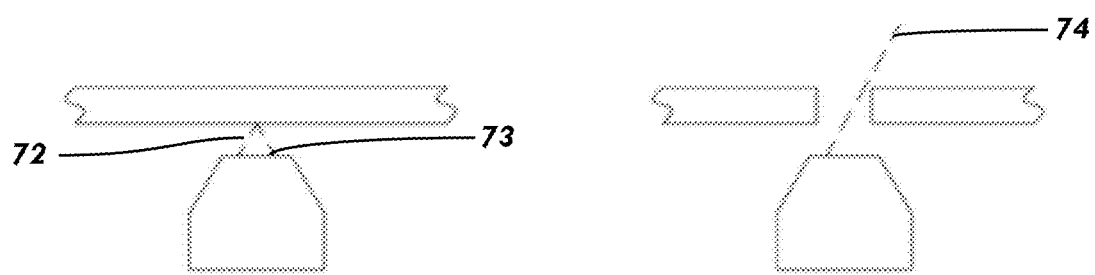
FIG. 24 is a cross-sectional side view of a rotor disk and optical sensor according to one embodiment of the present disclosure.
Figure 27:
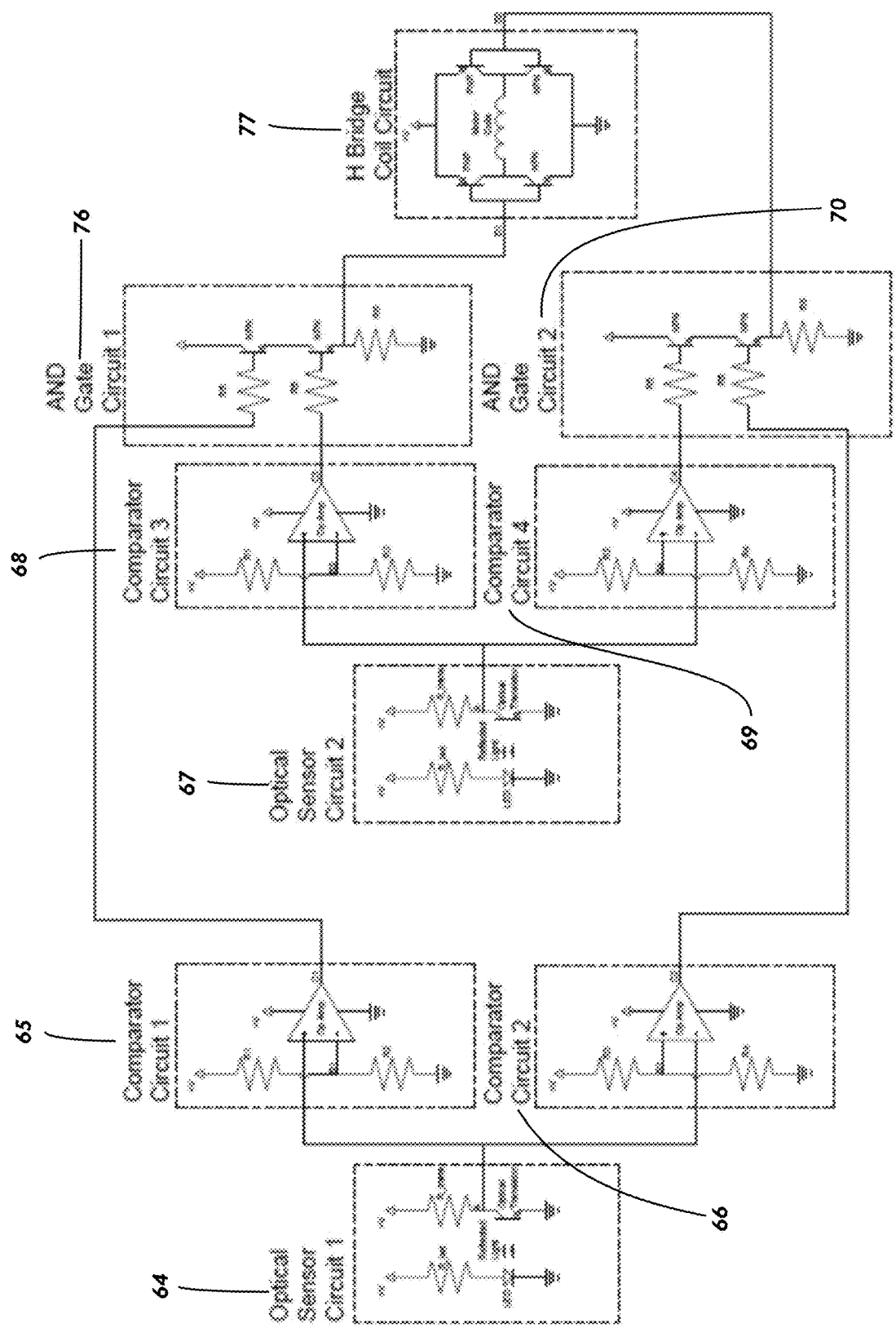
FIG. 27 is a diagram of a unipolar phase i coil control circuit according to one embodiment of the present disclosure.

Phase 1 and Phase II coils operate independently from one another. Phase I coil circuit configuration and operation will be explained in detail with the understanding that there is an identical circuit for Phase II operation. As shown in FIG. 27, the phase I optical sensor 1 circuit 64 and optical sensor 2 circuit 67 may be identical. Each is comprised of a resistor (R led) that adjusts current delivered to a light source (e.g., LED) along with a resistor (R trans) that limits current through the optical transistor. FIG. 23 shows the positions of sections A-A and B-B as illustrated in FIG. 24. The light emitted from the light source is shown reflecting off the rotor surface in Section B-B 72 and 73. In contrast, the light emitted from the source is shown in section A-A travels through the optical slot of the rotor and is not reflected 74. The result of reflected light is a low voltage value at point A1 of circuit 64 and/or A2 of circuit 67, as shown in FIG. 27, while the result of non-reflected light is a high voltage value at the point A1 and/or A2.

FIG. 27 shows comparator circuit 65 for optical sensor 1 and comparator circuit 68 for sensor 2. The configuration is identical in this example arrangement. Each is comprised of resistors (e.g., R1 and R2) and an Op Amp. Resistors R1 and R2 are configured in a voltage divider arrangement such that the voltage at point B1 is lower than point A1 when light is not reflected and greater than A1 when light is reflected. The voltage from A1 is connected to the non-inverting input of the Op Amp while the voltage from B1 is connected to the inverting input of the Op Amp. The voltage at the Op Amp output point C1 will be high when the rotor slot opening is above the sensor (e.g., Section A-A of FIG. 24) and low when the rotor surface is reflecting the sensor light (e.g., Section B-B of FIG. 24). Another pair of comparator circuits 66 and 69 are shown in FIG. 27 that may be identical to those described above. Circuit 66 is wired in parallel with circuit 65 in reading optical sensor circuit output voltage A1. Each circuit 66 and 69 has resistors (e.g., R3 and R4) and an Op Amp. The resistors are wired in a voltage divider configuration and the voltage at point B2 is such that it is higher than voltage A1 when light is reflected and lower than voltage A1 when light is not reflected. The voltage from B2 is connected to the non-inverting input of the Op Amp, while the A1 voltage is connected to the inverting input of the Op Amp. In summary, the output of sensor 1 comparator circuit 66 and sensor 2 comparator circuits 68 will be low when the rotor surface is over each of the respective sensors and high when it is not (i.e., when light projects through the slots). The output of sensor 1 comparator circuit 67 and sensor 2 comparator circuit 69 will go high when the rotor surface is over each respective sensors and low when it is not.

Outputs of circuits 65 and 68 are wired into an AND gate arrangement 76 as shown in FIG. 27, while the outputs of circuits 66 and 69 are wired into an identical AND gate circuit 70. Each AND gate circuit is comprised on two NPN transistors and three resistors R5, R6 and R7. Resistors R5 and R6 are used to limit output current flowing from circuit 65 and 68 respectively while resistor R7 limits the current flowing through the transistors when they are both operating. The output of AND gate circuits 76 and 70 are D1 and D2 respectively, as shown by truth table 78 of FIG. 28. The outputs of the AND gate circuits are wired into an H Bridge circuit 77 that provides bi-directional current control of the Phase I coils.

The H Bridges circuit 77 is comprised of two PNP transistors and two NPN transistors. The output of AND gate 76 is wired parallel to the bases of PNP Q6 and NPN Q7, while the output of AND gate 70 is wired in parallel to the bases of PNP Q8 and NPN Q9. The emitters of PNP's Q6 and Q8 are wired in parallel to the power rail. The collector of NPN Q7 is wired to the emitter of PNP Q6 and to one side of the phase 1 coil lead 1A in FIG. 29. The collector of NPN Q9 is wired to the emitter of PNP Q8 and to the other lead of phase 1 coils leads 1j in FIG. 29. The phase I coil operation is shown in the last column of the truth table 78 of FIG. 28. The direction of the current is shown with → and ← symbols, while an empty cell indicates that no current is flowing. The first column identifies 17 discrete angular positions of an individual magnet i (i.e., theta_i) as the rotor spins around the shaft FIG. 26, for example, illustrates five discrete positions of theta_i: 0 deg, 11.25 deg, 22.5 deg, 33.75 deg, and 45 deg.

Figure 31:
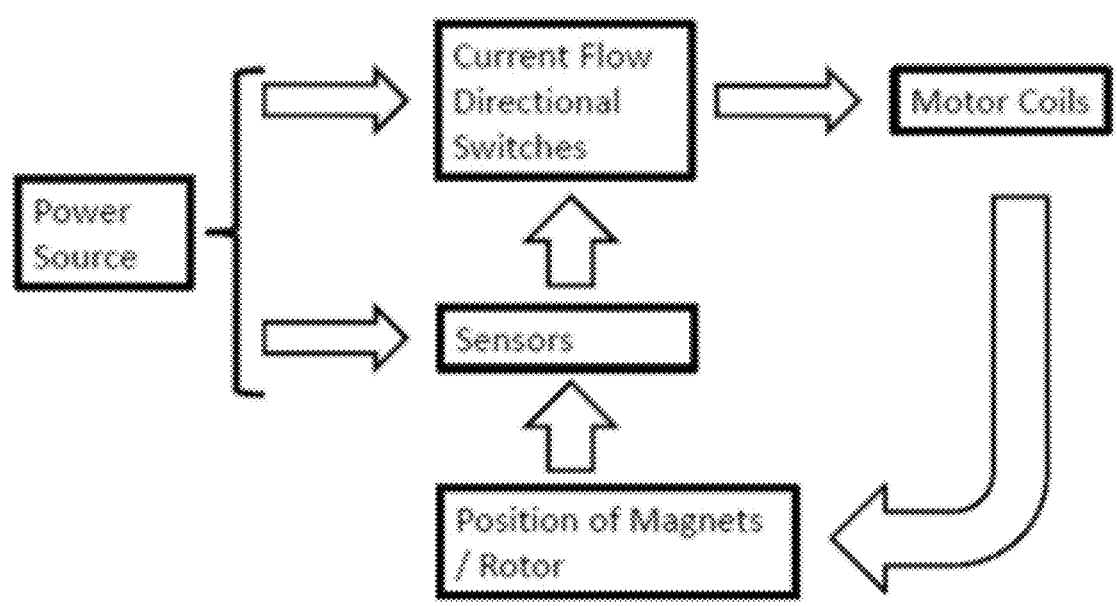
FIG. 31 is a flow chart of operation of a brushless motor according to one embodiment of the present disclosure.

FIG. 31, meanwhile, is a general operational flow diagram for the motor elements described herein. Supplying power to the motor causes the rotor to rotate, which can be detected by the sensors (e.g., optical sensor 1 48) that prompt the motor to reverse the flow of current. Other embodiments could also include, for example, solid state relays rather than conventional transistors.

Torque Ripple

Figure 30:
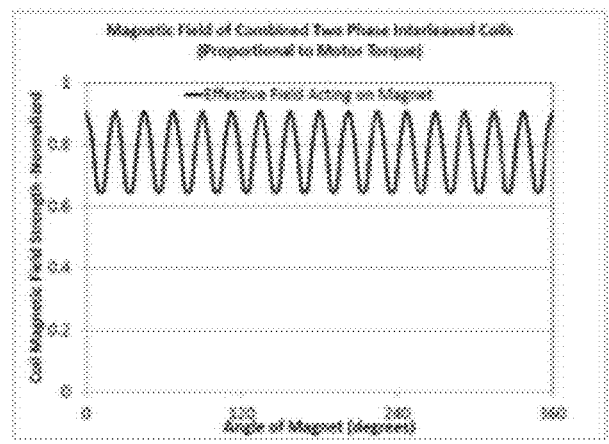
FIG. 30 shows graphs of magnetic field strengths of a two phase interleaved coil configuration according to one embodiment of the present disclosure.
Figure 30:
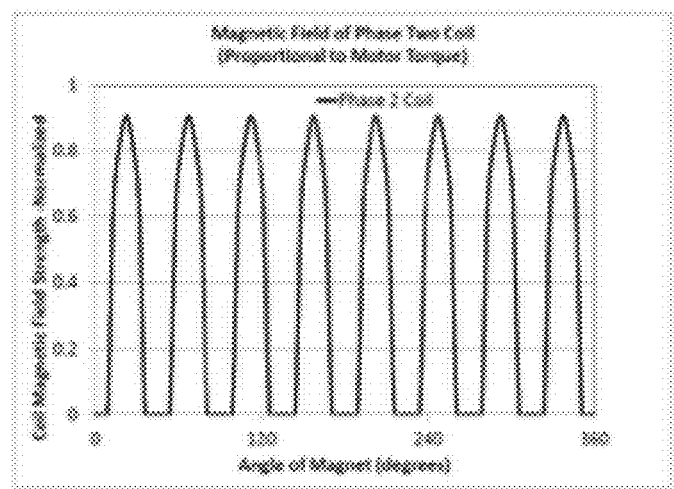
Figure 30:
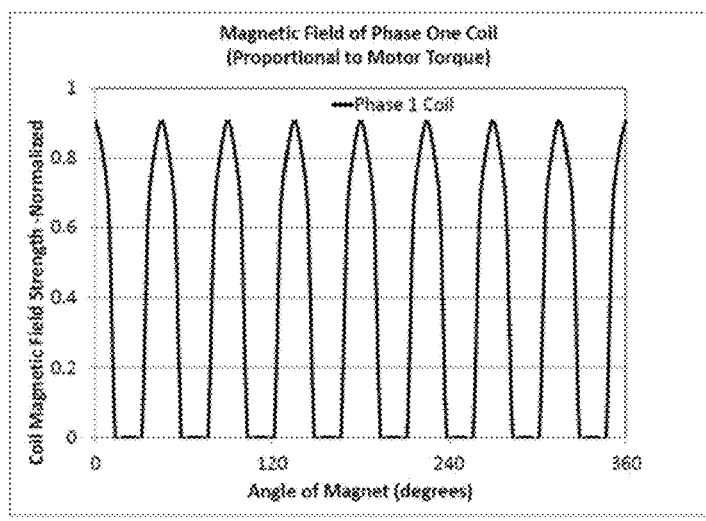

The magnetic field generated by Phase I coils varies based on the distance between the magnets and C-Coils. For example, the magnetic field of the phase I coil 45 depicted in FIG. 30 varies from 70% to 90% back to 70% as a pair of magnets move from theta/4 away from each Phase I C-Coil pair to be centered in the coils until they are theta/4 beyond the coil. The phase I field then drops to zero as the magnets move from theta/4 to ¾*theta away from the phase I coil set. The Phase II magnetic Field 44 is shown having the same shape as phase I 45 but offset by theta/2. The combined effect on the rotor is illustrated by 43. The magnets on the rotor are seen to experience a variation from 70% to 90% and back to 70% through every rotation of theta/2.

The brushless motor of the present disclosure advantageously provides a motor having a higher torque density than traditional electric motors. By allowing each of the permanent magnets to pass through centers of the C-coils, the permanent magnets pass through a convergent area of the C-coils' magnetic field, thereby increasing an amount of the magnetic field encountered by the permanent magnets. Further, the arrangement of C-coils around the rotor disk make the brushless motor of the present disclosure suitable for applications wherein the rotor disk may and permanent magnets be incorporated into an existing mechanism. For example, the brushless motor of the present disclosure may be used to provide assisted power to a bicycle, wherein the rotor disk is formed of a chain ring of the bicycle. A chain wrapped around teeth of the chain ring may pass through the C-coils while permanent magnets embedded on the chain ring aid in rotating the chain ring and thereby assist with propelling a bicycle. Additionally, a spur gear or other toothed profile may be formed on an outer edge of the rotor disk, allowing the brushless motor of the present disclosure to engage adjacent gears and reduce a number of gear components of an assembly.

The foregoing description of preferred embodiments of the present disclosure has been presented for purposes of illustration and description. The described preferred embodiments are not intended to be exhaustive or to limit the scope of the disclosure to the precise form(s) disclosed. Obvious modifications or variations are possible in light of the above teachings. The embodiments are chosen and described in an effort to provide the best illustrations of the principles of the disclosure and its practical application, and to thereby enable one of ordinary skill in the art to utilize the concepts revealed in the disclosure in various embodiments and with various modifications as are suited to the particular use contemplated. All such modifications and variations are within the scope of the disclosure as determined by the appended claims when interpreted in accordance with the breadth to which they are fairly, legally, and equitably entitled.

What is claimed is:

1. A brushless motor comprising:
   a rotor disk including
      a plurality of magnet slots arranged around a perimeter of the rotor disk, the plurality of slots oriented substantially perpendicular to a circumference of the rotor disk and
      a plurality of elongated optical slots arranged circumferentially at a fixed radius around and from a center of the rotor disk, each of the plurality of elongated optical slots having a length corresponding to a width of an angle between consecutive of the plurality of magnet slots;
   a plurality of permanent magnets attached to the rotor disk and positioned within the plurality of magnet slots oriented perpendicular to the circumference of the rotor disk, the permanent magnets oriented such that the poles each of the plurality of magnets are opposite the poles of adjoining permanent magnets;
   one or more pairs of connected C-coils arranged around the rotor disk, each of the pairs of connected C-coils including
      a first coil loop body comprising a coil wound in a clockwise direction and a channel formed in the first coil loop body and a second coil loop body comprising a coil wound in a counterclockwise direction and a channel formed in the second coil loop body, wherein each pair of C-coils is connected with a pair of legs, and
      wherein the C-coils are supported by a housing such that the permanent magnets attached to the rotor disk pass substantially within the coil loop body;
   at least one circuit in electronic communication with the one or more pairs of connected C-coils; and
   at least one optical sensor in electronic communication with the one or more circuits, the optical sensor positioned adjacent to the rotor disk at a radius of the plurality of the plurality of optical slots;
   wherein the circuit outputs a voltage to the one or more pairs of connected C-coils, and wherein a value of the output voltage from the circuit is based on the optical sensor being in alignment with one of the plurality of optical slots of the rotor disk.

2. The brushless motor of claim 1, wherein when the optical sensor is aligned with one of the plurality of optical slots the circuit induces a current flow in a first direction, and when the optical sensor is aligned with a solid portion of the rotor disk the circuit induces a current flow in a second direction that is opposite the first direction such that the brushless motor is substantially bipolar.

3. The brushless motor of claim 1, wherein each C-coil of a pair of C-coils is oriented at an offset angle relative to one another such that each C-coil is aligned with the plurality of optical slots of the rotor disk.

4. The brushless motor of claim 1, wherein the plurality of optical slots are aligned at a first edge with a center of one of the magnet slots and at a second edge with a center of an adjoining magnet slot.

5. The brushless motor of claim 1, wherein at least one pair of C-coils is substantially interleaved with an adjoining pair of C-coils such that a C-coil of one pair of C-coils is between C-coils of another C-coil pair around a circumference of the rotor disk.

6. The brushless motor of claim 5, wherein one pair of C-coils comprises a first phase C-coil pair and the other pair comprises a second phase C-coil pair.

7. The brushless motor of claim 5, further comprising one or more second phase optical slots arranged circumferentially at a second fixed radius.

8. The brushless motor of claim 1, wherein one pair of interleaved C-coils is in communication with a first phase circuit, and wherein the other pair of interleaved C-coils is in communication with a second phase circuit.

9. The brushless motor of claim 1, wherein the plurality of permanent magnets and plurality of pairs of connected C-coils are oriented around the rotor disk such that when one permanent magnet is aligned in a center of at least one of the first or second C-coil of the pairs of connected C-coils, another permanent magnet is aligned in a center of the other of the first or second C-coil of the pairs of connected C-coils.

10. The brushless motor of claim 1, wherein the C-coils are supported by a plurality of C-coil plates, each of the C-coil plates including a central hole formed therethrough and an opening along an interior edge of the C-coil plate to accommodate the rotor disk and pair of legs of the C-coils.

11. A brushless motor comprising:
   a rotor disk including a plurality of permanent magnets attached to the rotor disk, the permanent magnets oriented such that a north face and south face of the permanent magnet are perpendicular to an outer edge of the rotor disk, wherein the permanent magnets are substantially uniformly spaced around an edge of the rotor disk and wherein a polarity of adjoining permanent magnets is substantially reversed;
   one or more elongated optical slots arranged circumferentially at a radial distance from a center of the rotor disk, the elongated optical slots having a length corresponding to a width of an angle between consecutive of the plurality of magnets;
   at least one pair of connected C-coils, each C-coil of the pair of connected C-coils having a coil loop body wound in an opposite direction of another of the C-coil of the pair of connected C-coils and a channel formed through a center of the coil loop body for accommodating one of the plurality of permanent magnets and a gap formed along an edge of the C-coils for accommodating the rotor disk, the C-coils connected with a pair of legs;
   at least one circuit in electronic communication with the at least one pair of connected C-coils for controlling a current supplied to the C-coils; and
   an optical sensor in electronic communication with the at least one circuit, the optical sensor including a light projecting element and a light detecting element, the optical sensor positioned adjacent the optical slots of the rotor disk.

* * * * *